United States Patent
Haman et al.

[11] Patent Number: 6,166,728
[45] Date of Patent: Dec. 26, 2000

[54] DISPLAY SYSTEM WITH PROGRAMMABLE DISPLAY PARAMETERS

[75] Inventors: R. Thomas Haman, Suwanee; Robert O. Banker, Cumming; Chamnan Ith, Atlanta; Kinney C. Bacon, Lawrenceville, all of Ga.

[73] Assignee: Scientific-Atlanta, Inc., Norcross, Ga.

[21] Appl. No.: 08/072,291

[22] Filed: Jun. 7, 1993

Related U.S. Application Data

[63] Continuation-in-part of application No. 07/983,909, Dec. 2, 1992, abandoned.

[51] Int. Cl.$^7$ ........................................... H04N 7/10
[52] U.S. Cl. ..................... 345/327; 348/10; 348/12
[58] Field of Search ........................ 345/25, 26, 113, 345/114, 115, 116, 141, 142, 143, 144, 194, 327; 348/7, 8, 910, 12, 467, 584, 588, 589, 596, 600; 380/5; 707/217–219

[56] References Cited

U.S. PATENT DOCUMENTS

| | | | |
|---|---|---|---|
| Re. 32,187 | 6/1986 | Barda et al. | 345/194 |
| 3,539,999 | 11/1970 | Houldin et al. | 340/172.5 |
| 3,789,131 | 1/1974 | Harney | 178/5.1 |
| 3,997,718 | 12/1976 | Ricketts et al. | 178/6.8 |
| 4,031,543 | 6/1977 | Holz | 358/86 |
| 4,117,268 | 9/1978 | Bartlett | 179/15 |
| 4,156,847 | 5/1979 | Tazawa et al. | 325/308 |
| 4,264,924 | 4/1981 | Freeman | 358/86 |
| 4,360,828 | 11/1982 | Briggs, Jr. et al. | 358/86 |
| 4,414,621 | 11/1983 | Bown et al. | 364/200 |
| 4,430,669 | 2/1984 | Cheung | 358/122 |
| 4,437,093 | 3/1984 | Bradley | 345/125 |
| 4,439,759 | 3/1984 | Fleming et al. | 340/703 |
| 4,439,760 | 3/1984 | Fleming | 340/799 |
| 4,439,784 | 3/1984 | Furukawa et al. | 358/86 |
| 4,451,701 | 5/1984 | Bendig | 179/2 TV |
| 4,475,123 | 10/1984 | Dumbauld et al. | 358/114 |
| 4,486,779 | 12/1984 | Marti | 358/147 |

(List continued on next page.)

FOREIGN PATENT DOCUMENTS

| | | |
|---|---|---|
| 0 190 837 | 8/1986 | European Pat. Off. . |
| 1048122 | 2/1989 | Japan . |
| wO 86/01962 | 3/1986 | WIPO . |

OTHER PUBLICATIONS

*M50455–XXXSP TV Screen Character and Pattern Display Controller Data Sheets*, by Mitsubishi, dated on or about Oct. 1987.
International Search Report for PCT/US94/06341.

Primary Examiner—Nathan Flynn
Attorney, Agent, or Firm—Kenneth M. Massaroni; Hubert J. Barnhardt, III; Kelly A. Gardner

[57] ABSTRACT

A display system for providing programmable on-screen displays for a subscriber terminal, includes a control processor and a display processor which generates such displays from stored display information and display attributes. The control processor executes display routines to configure the display processor and to load the display data into a display memory. The display routines, display attributes and display data are programmable and can be varied for optimal use of the display processor. In one implementation, such information can be modified by changing the programming in non-volatile memory of the subscriber terminal, either by switching ROM or Flash EPROM ICs or by a plug in module. Another implementation includes downloading the information with other executable code and data in the read/write portions of the non-volatile memory. A third implementation provides specialized display transactions for the information which, in a preferred embodiment, envisions a high level screen definition language whose commands can be compiled into the formats of the display routines, display attributes and display data.

85 Claims, 14 Drawing Sheets

U.S. PATENT DOCUMENTS

| | | | |
|---|---|---|---|
| 4,494,142 | 1/1985 | Mistry | 358/118 |
| 4,496,976 | 1/1985 | Swanson et al. | 345/113 |
| 4,510,568 | 4/1985 | Kishi et al. | 364/300 |
| 4,520,356 | 5/1985 | O'Keefe et al. | 345/194 |
| 4,536,791 | 8/1985 | Campbell et al. | 358/122 |
| 4,558,464 | 12/1985 | O'Brien, Jr. | 348/10 |
| 4,575,579 | 3/1986 | Simon et al. | 178/4 |
| 4,586,158 | 4/1986 | Brandle | 364/900 |
| 4,600,921 | 7/1986 | Thomas | 348/1 |
| 4,626,892 | 12/1986 | Nortrup et al. | 358/21 R |
| 4,633,297 | 12/1986 | Skerlos et al. | 358/22 |
| 4,641,205 | 2/1987 | Beyers, Jr. | 360/33.1 |
| 4,658,290 | 4/1987 | McKenna et al. | 358/84 |
| 4,712,239 | 12/1987 | Frezza et al. | 348/10 |
| 4,739,318 | 4/1988 | Cohen | 345/142 |
| 4,742,344 | 5/1988 | Nakagawa et al. | 345/27 |
| 4,742,543 | 5/1988 | Frederiksen | 380/9 |
| 4,786,967 | 11/1988 | Smith, III et al. | 358/143 |
| 4,787,085 | 11/1988 | Suto et al. | 370/110.1 |
| 4,821,102 | 4/1989 | Ichikawa et al. | 358/183 |
| 4,829,569 | 5/1989 | Seth-Smith et al. | 380/10 |
| 4,866,770 | 9/1989 | Seth-Smith et al. | 380/20 |
| 4,885,775 | 12/1989 | Lucas | 380/10 |
| 4,908,834 | 3/1990 | Wiedemer | 380/5 |
| 4,912,760 | 3/1990 | West, Jr. et al. | 380/7 |
| 4,961,109 | 10/1990 | Tanaka | 348/10 |
| 4,963,994 | 10/1990 | Levine | 358/335 |
| 4,987,486 | 1/1991 | Johnson et al. | 358/86 |
| 4,991,011 | 2/1991 | Johnson et al. | 358/141 |
| 5,003,591 | 3/1991 | Kauffman et al. | 348/5 |
| 5,046,093 | 9/1991 | Wachob | 380/20 |
| 5,089,885 | 2/1992 | Clark | 348/12 |
| 5,091,936 | 2/1992 | Katznelson et al. | 380/19 |
| 5,093,921 | 3/1992 | Bevins, Jr. | 455/4 |
| 5,109,279 | 4/1992 | Ando | 348/468 |
| 5,146,210 | 9/1992 | Heberle | 348/734 |
| 5,294,982 | 3/1994 | Salomon et al. | 348/461 |
| 5,357,276 | 10/1994 | Banker et al. | 348/7 |
| 5,367,571 | 11/1994 | Bowen et al. | 380/20 |
| 5,375,160 | 12/1994 | Guidon et al. | 348/468 |
| 5,420,923 | 5/1995 | Beyers, II et al. | 348/468 |
| 5,432,542 | 7/1995 | Thibadeau et al. | 348/6 |
| 5,440,632 | 8/1995 | Bacon et al. | 380/20 |

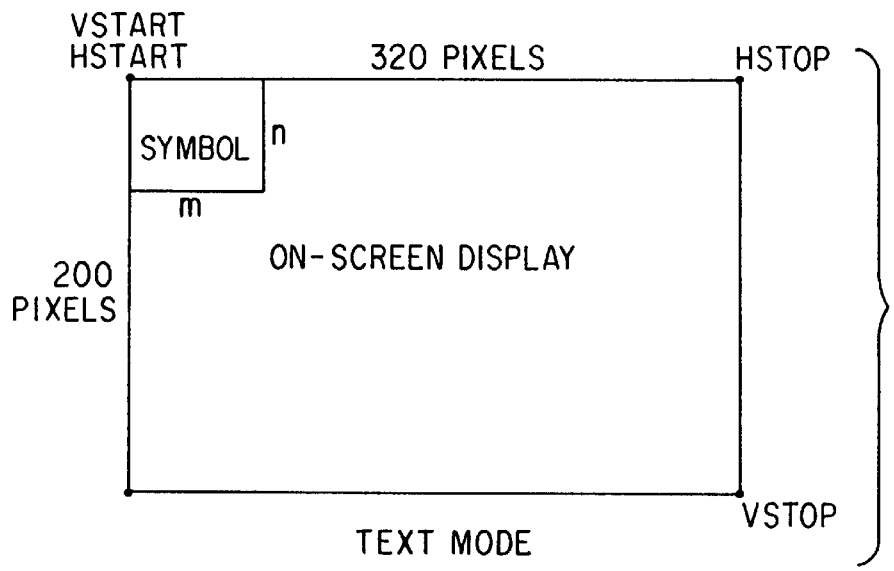
FIG. 3 TEXT MODE
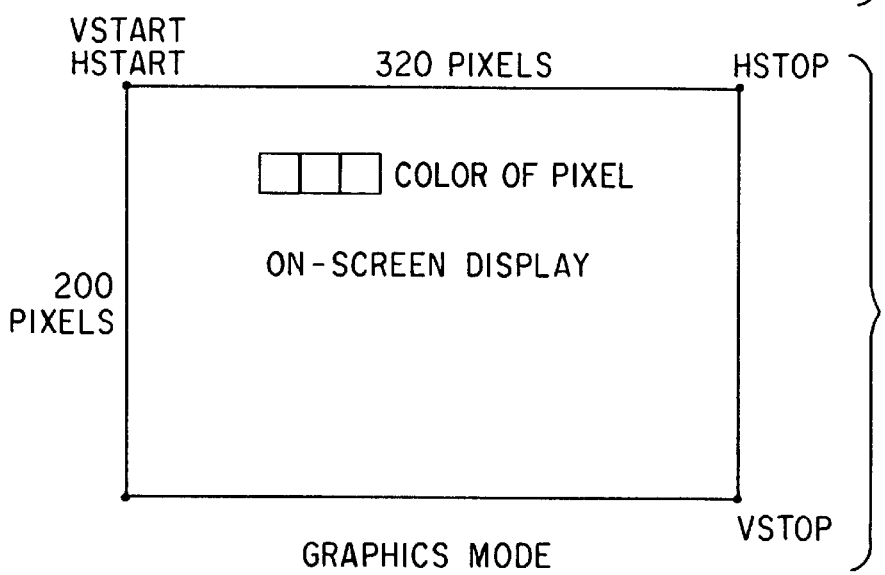
FIG. 4 GRAPHICS MODE
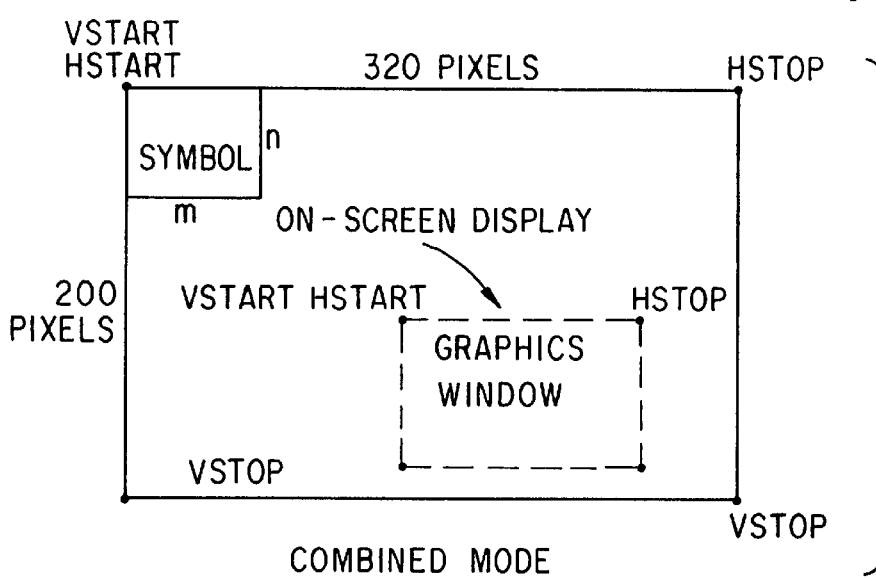
FIG. 5 COMBINED MODE

| BYTE | | | | | | | | |
|---|---|---|---|---|---|---|---|---|
| 0 | 0 | | vbi | aud | 0 | | 0 | 0 |
| 1 | | | DISPLAY msb | | | | | |
| 2 | | | " | midsb | | | | |
| 3 | | | " | lsb | | | | |
| 4 | | PAGE | | | OFF | 1 | | 0 |
| 5 | | | TRANSACTION CODE | | | | | |
| 6 | | 1stsq | | SEQUENCE | | | | |
| 7 | | | DISPLAY | DATA | | | | |
| 8 | | | DISPLAY | DATA | | | | |
| 9 | | | DISPLAY | DATA | | | | |
| 10 | | | DISPLAY | DATA | | | | |
| 11 | | | DISPLAY | DATA | | | | |
| 12 | | | DISPLAY | DATA | | | | |
| 13 | | | DISPLAY | DATA | | | | |
| 14 | | | DISPLAY | DATA | | | | |
| 15 | | | DISPLAY | DATA | | | | |
| 16 | | | DISPLAY | DATA | | | | |
| 17 | | | DISPLAY | DATA | | | | |
| 18 | | | DISPLAY | DATA | | | | |
| 19 | | | DISPLAY | DATA | | | | |
| 20 | | | DISPLAY | DATA | | | | |
| 21 | | | DISPLAY | DATA | | | | |

FIG.16

DISPLAY SYSTEM WITH PROGRAMMABLE DISPLAY PARAMETERS

CROSS REFERENCE TO RELATED APPLICATIONS

This application is a continuation-in-part of application Ser. No. 07/983,909, now abandoned, entitled "Reprogrammable Subscriber Terminal", filed Dec. 2, 1992 in the names of Bacon, et al. and commonly assigned with the present application. The disclosure of Bacon, et al. is hereby incorporated by reference herein.

FIELD OF THE INVENTION

The invention pertains generally to a subscriber terminal for CATV or other subscription television systems and is more particularly directed to an on-screen display system for such subscriber terminals.

BACKGROUND OF THE INVENTION

The subscriber terminal, more commonly known as a set top terminal, is an integral component of subscription television systems. These subscription television systems can be cable television (CATV) systems, multi-point, multi-distribution subscription (MMDS) systems, or direct-to-home (DTH) systems. The terminals have conventionally provided the functions of tuning particular channels of the subscription system which are outside the subscriber's television receiver capability. Further, they provide conditional access to the particular subscription service through authorization codes and in many services provide tiering or authorization of particular channels of the service by descrambling.

More recently, the subscriber terminal has become user friendly by providing an interactive, on-screen display and other user functions that allow the subscriber to manipulate the cable service and his television receiver in additional ways. These features include such things as volume control, pay-per-view event confirmation, favorite channel listings, sleep timer features, parental control capability, program timers for recording VCR programs and other types of consumer friendly operational features.

In addition, some of the features found in newer television receivers can be provided for older receivers by the subscription terminal. For example, channel identity, and mute and volume control can be accomplished by the subscriber terminal making the subscriber's television receiver appear to be a newer model with these capabilities.

An advantageous example of a subscriber terminal with these advanced consumer features is the Model 8600 series of subscriber terminals manufactured by Scientific-Atlanta, Inc. of Norcross, Ga.

These terminals generally provide on-screen displays by combining the video signal from a selected channel with an on-screen display video signal from a video generator prior to the remodulation of the combination to either Channels 3 or 4. The subscriber terminal generates timed control codes to the video generator which describe the various displays which are to be provided on the subscriber's television screen.

However, with the totality of the new features which are available in the advanced subscriber terminals, the flexibility and memory capability of the terminal for on-screen display has been exceeded. This is particularly the case in the area of providing specially defined characters or specially sized characters. Conventional video generator chips usually provide a limited set of characters and a single or severely restricted set of character fonts. For a truly flexible system, a bit-mapped or full graphics mode should be used. This type of graphic system however has been too memory and computationally intensive for subscriber terminals in the past. Further, there is generally no method for reprogramming a subscriber terminal to change the graphics capability of a display once it has been delivered to a subscriber. This makes the user interface extremely difficult to update or upgrade.

What is needed is an advanced display system which is flexible and powerful enough to support the advanced features available today in subscriber terminals and which will be capable of supporting the features which will be incorporated into the subscriber terminals of the future.

In the referenced parent application by Bacon, et al., there are several methods and apparatus described for changing the executable code and data of a control processor utilized in a subscriber terminal of subscription television system. These methods include replacing the integrated circuits forming the non-volatile memory of the subscriber terminals, whether ROM or Flash EPROM. The apparatus described further includes the provision of additional non-volatile memory included on a plug in module. Another advantageous method of changing the executable code and data of the subscriber terminal is described as downloading the code into read/write non-volatile memory of the subscriber terminal from the headend of the subscription television system by means of communication transactions.

In copending application Ser. No. 08/073,404, filed Jun. 7, 1993 in the names of Banker, et al. and commonly assigned with this present application, there is described an on-screen display controller which is controlled by the control processor of a subscriber terminal. The control processor has a display routine in its executable code which loads the display controller with stored display attributes and a volatile memory with display data. The control processor then enables the display controller to process this data. The display attributes and display data for the on-screen display are stored in a display area of the non-volatile memory of the control processor.

Because the on-screen displays of a subscriber terminal are used extensively to interact with the subscriber, they should be flexible and changeable to allow necessary updates and an adaptive capability for a particular situation or subscriber. Therefore, it would be extremely advantageous to provide a display system with programmable display parameters, including display attributes and display information. Further, in concert with the system described in Banker, et. al., it would be advantageous to be able to change the display routines in an easy manner.

SUMMARY OF THE INVENTION

The invention includes a display system for providing programmable on-screen displays for a subscriber terminal. The on-screen displays are generated by a display processor from stored screen information and display attributes in the display data section of a non-volatile memory. The control processor uses a display routine to configure the display processor with the display attributes and transfer the stored display information to a volatile display memory.

In one embodiment the stored display data and display attributes are provided from a read only memory (ROM). Preferably, such stored display data and display attributes are accessed from the ROM to display screens which must be used repeatedly. Such on-screen displays are menu screens, message screens, and so-called ROM barker screens which display the same information, or other screens which do not change.

In a second preferred embodiment, the stored display data and display attributes are downloadable from the system manager of the headend of a subscription television system into non-volatile memory of the subscriber terminal, such as Flash EPROM or battery backed up RAM. The stored screen information and attributes are downloaded in a global manner with other executable code and data for all of the subscriber terminals.

In yet a third preferred embodiment of the invention, a series of display transactions are used to build screen displays with the on-screen display information and display attributes. A high level display language is formulated where communication transactions can be sent globally or addressably to all of the subscriber terminals of the subscription television system. The transactions describe display screens in an efficiently compressed manner. The compressed information is decoded thereafter by expansion routines executable by the control processor of the subscriber terminal. The expansion routines expand the display transactions into the common format for the display data and the display attributes and then load them into non-volatile memory in the same area as other display data and display attributes. The display data and display attributes from the display transactions may then be displayed by the display processor in the same manner that other display information and attributes are processed.

Accordingly, it is one of the objects of the invention to provide on-screen display information and display attributes which can be changed or varied to produce different capabilities and images for an on-screen display system.

It is a further objective of the invention to vary such on-screen display information and display attributes by replacing a non-volatile memory, for example, ROM or Flash EPROM memory in which such data is stored.

Another objective of the invention is to vary such on-screen display information and display attributes by downloading them to a non-volatile memory from the headend of a subscription television system.

It is another object of the invention to vary such on-screen display information and attributes by a plug in module containing such non-volatile memory.

Another object of the invention is to vary on-screen display information and display attributes by downloading them via communication transactions and storing them in non-volatile memory.

Lastly, one of the objects of the invention is to vary such on-screen display information and attributes by providing a high level screen display language for such communication transactions.

BRIEF DESCRIPTION OF THE DRAWINGS

These and other objects, features and aspects of the invention will be more clearly understood and better described if the following detailed description of the preferred embodiments is read in conjunction with the appended drawings wherein:

FIGS. 3–7 are a pictorial representation of the different modes of the on screen display system of the subscriber terminal illustrated in FIG. 2;

FIG. 16 is a representation of various bytes used in the display system.

The Appendix in pages 33–38 shows various forms of display transaction commands and their parameter data for execution by the expansion routine.

DETAILED DESCRIPTION OF THE PREFERRED EMBODIMENTS

Figure 1:
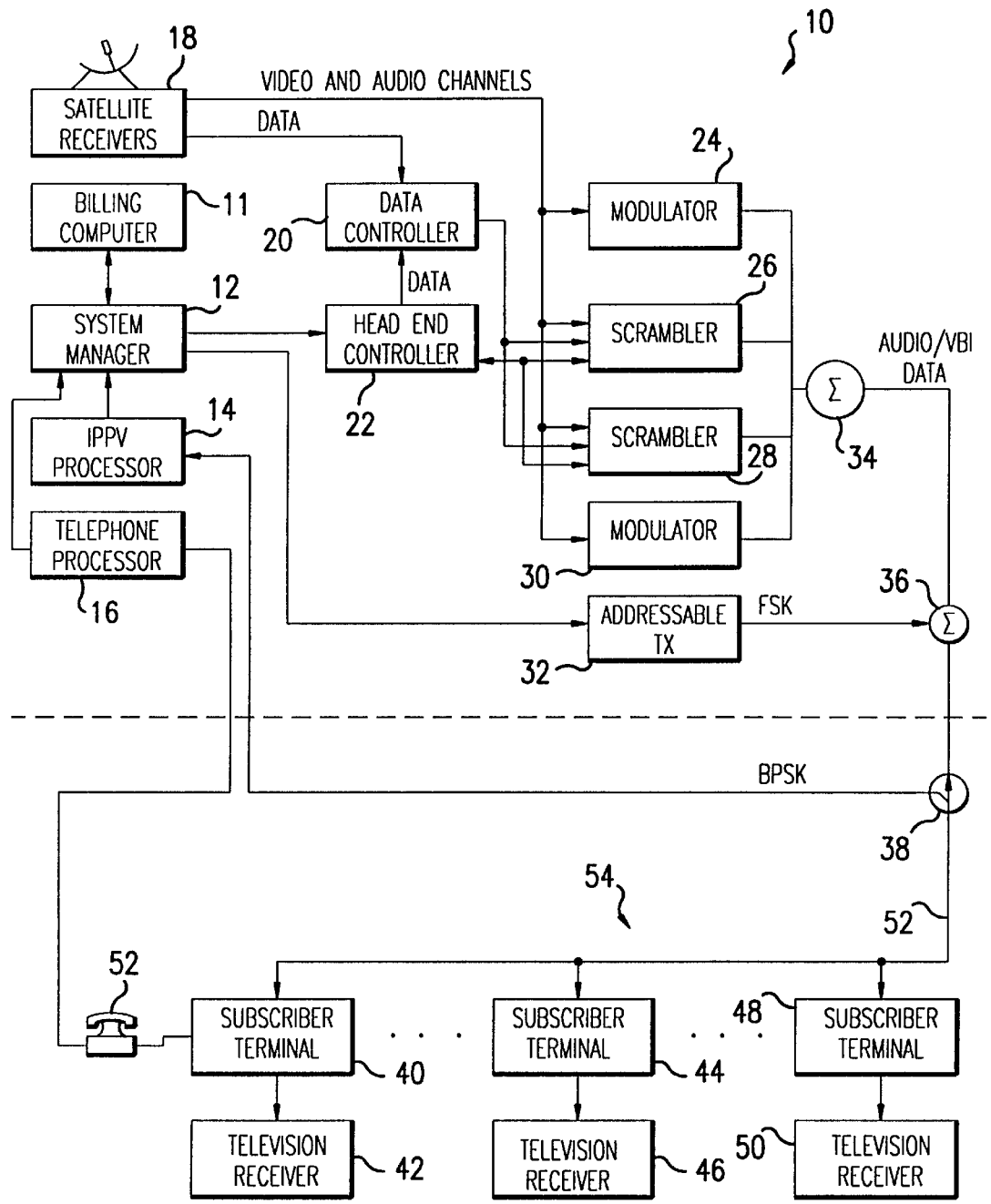
FIG. 1 is a system block diagram of a subscription television system of the CATV type which includes a multiplicity of subscriber terminals.

A subscription television system of the CATV type is more fully illustrated in FIG. 1. The subscription television system includes a headend 10 and a plurality of subscriber terminals 40, 44 and 48 which are connected over a distribution system 52. As is conventional, the distribution system 52 may include coaxial or optical fiber cable, system amplifiers, line extenders, etc. The headend 10 is under the supervision of a system manager 12 which controls a hardware controller, headend controller 22. A billing computer 11 communicates with the system manager 12 to authorize and transmit transactions to subscribers.

The television or other programming for the subscription system may come from a satellite downlink where it is decoded and demodulated by satellite receivers 18 into a number of channels. Each channel is either applied to a modulator 24 and 30 or a scrambler and modulator 26 and 28 which, under the control of the headend controller 22, remodulates the channels to the frequencies of the local subscription system channel line up. For a premium or restricted channel service (tiered, pay-per-view, or the like), some channels are scrambled by any of the known CATV methods by the scramblers and modulators 26 and 28. While the other channels can be transmitted without conversion. The program channels are then frequency division multiplexed onto the distribution system 52 by an RF combiner 34 as a broadband television signal. The plurality of channels of programming can then be transmitted over the distribution system 52 and supplied to each of the subscriber terminals 40, 44, and 48.

The scramblers and modulators 26 and 28 further may include the function of data insertion for its particular channel. This method of providing the data within the channel signal is generally termed in-band signaling. The data may be applied to any audio portion, video portion or both the audio and video portions in combination, or any other portion of the television channel. Many subscription television systems have amplitude modulated data pulses on the audio subcarrier. Further, in other subscription television systems, data may be inserted into the vertical and/or horizontal blanking intervals of the video portion.

The data which is inserted into the television channel in this manner can be conditional access data to globally or locally address and control the subscriber terminals 40, 44 and 48, on screen text data, or other types of information from the headend controller 22. Other data and information, such as electronic program guides and information services, can be inserted into the channels from a data controller 20. The data controller 20 can receive local data or national data from the satellite downlink through the satellite receiver 18.

In addition, data can be transmitted over the distribution system 52 by out-of-band signaling. In this mode, the system manager 12 accesses an addressable transmitter 32 with transactions to transmit this data. The addressable transmitter 32 may be used to modulate a data signal on a frequency not associated with the television programming. The broadband television programming of the cable systems has generally been applied from 50 Mhz to 550 Mhz and above, while out-of-band signaling systems have been used in non-video portions of these signals, such as at 108.2 Mhz with a frequency shift keying modulation technique. These transactions are combined with the broadband television signal at 36 and transmitted to the subscriber terminals 40, 44 and 48.

Transactions in the system are designated as addressed (to a particular subscriber terminal or group of subscriber terminals) or global (to all subscriber terminals). These transactions are in a standardized format which can be sent over any of the communication paths mentioned.

Signaling and data information may also flow in the reverse direction from the subscriber terminals to the headend via a reverse signaling path through the distribution system 52. In one form, the reverse signals are digital biphase shift keying (BPSK) modulated and applied to a frequency below 50 Mhz. The signals flow back from the subscriber terminals to an IPPV processor where they are decoded. In addition, any of the subscriber terminals 40, 44 and 48 may include a modem and telephone link 52 to a telephone processor 16 at the headend 10. The information from processors 14 and 16 are directed to the system manager 12, which communicates to the billing computer 11 to obtain authorization and billing information. The reverse signaling system has generally been used for ordering pay-pay-view (PPV) or impulse-pay-per-view (IPPV) events. In the future the reverse signal path may be used for any number of additional interactive services.

Figure 2A:
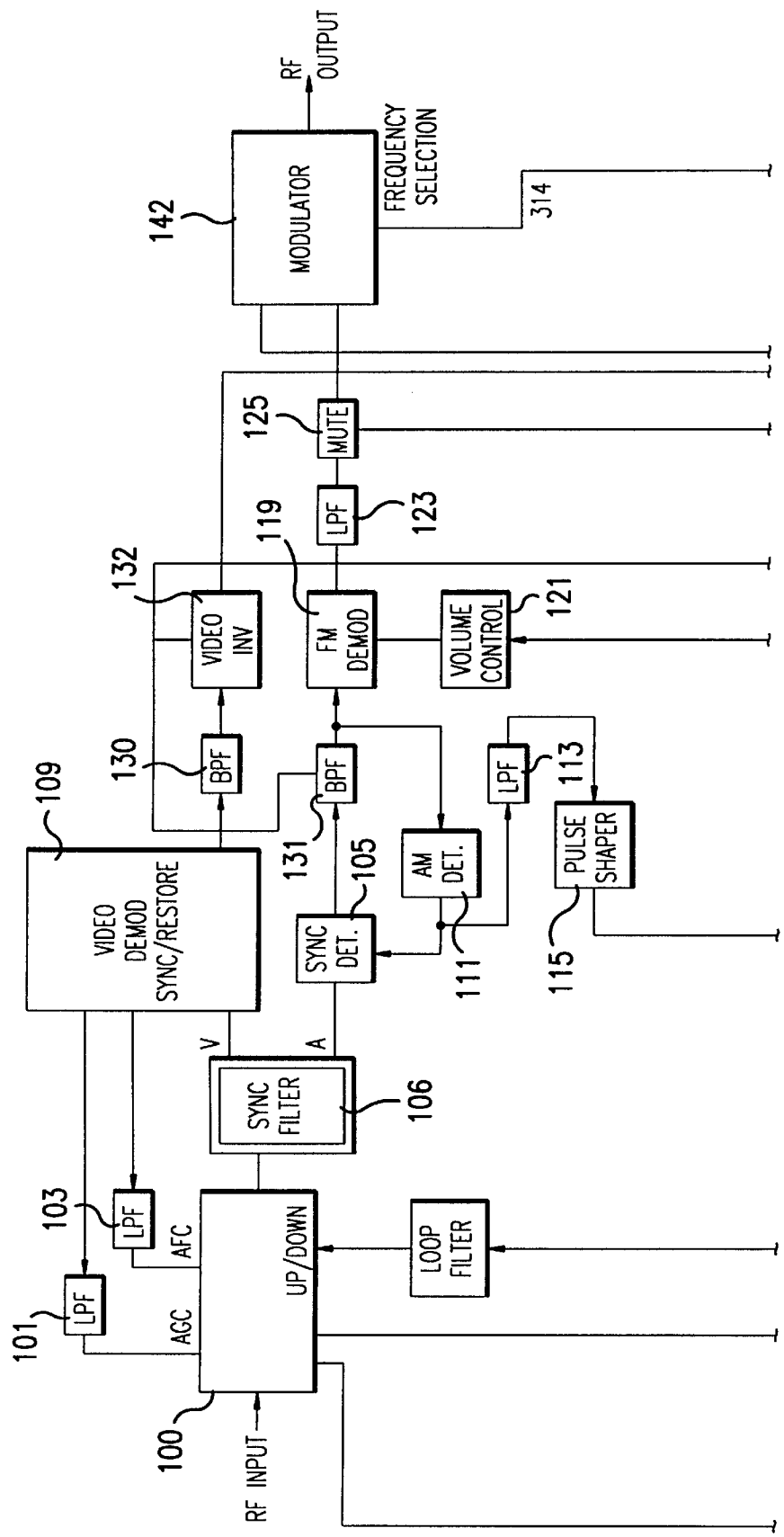
FIG. 2 is a detailed block diagram of one of the subscriber terminals of the system illustrated in FIG. 1.
Figure 2B:
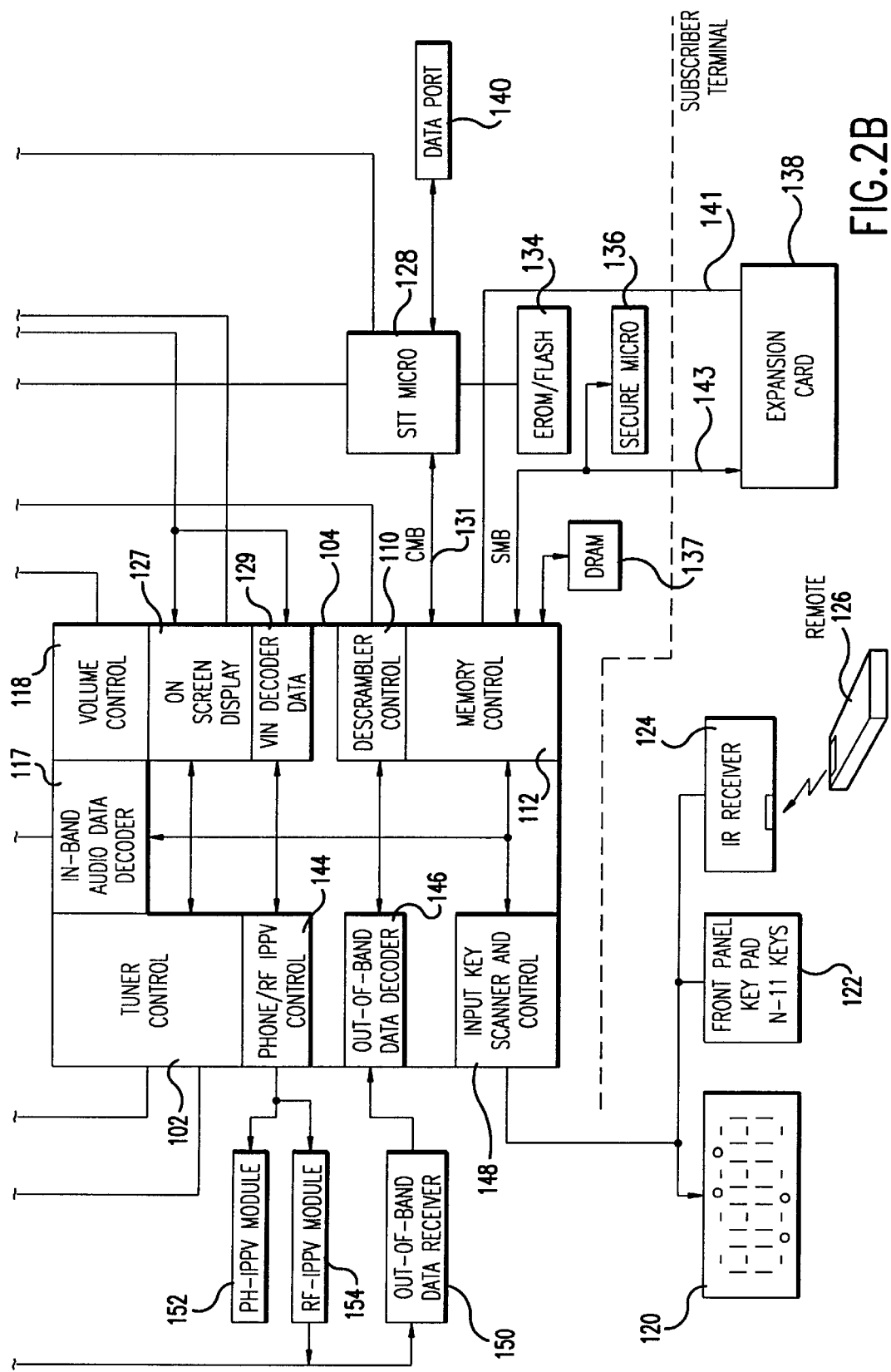
Figure 6:
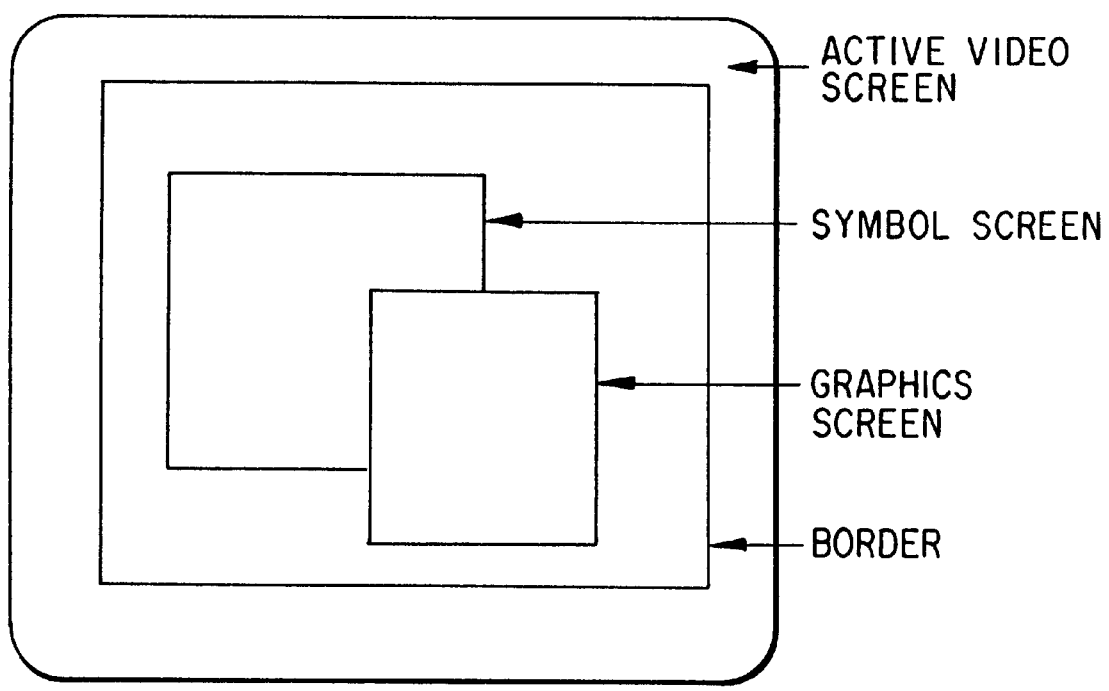
Figure 7:
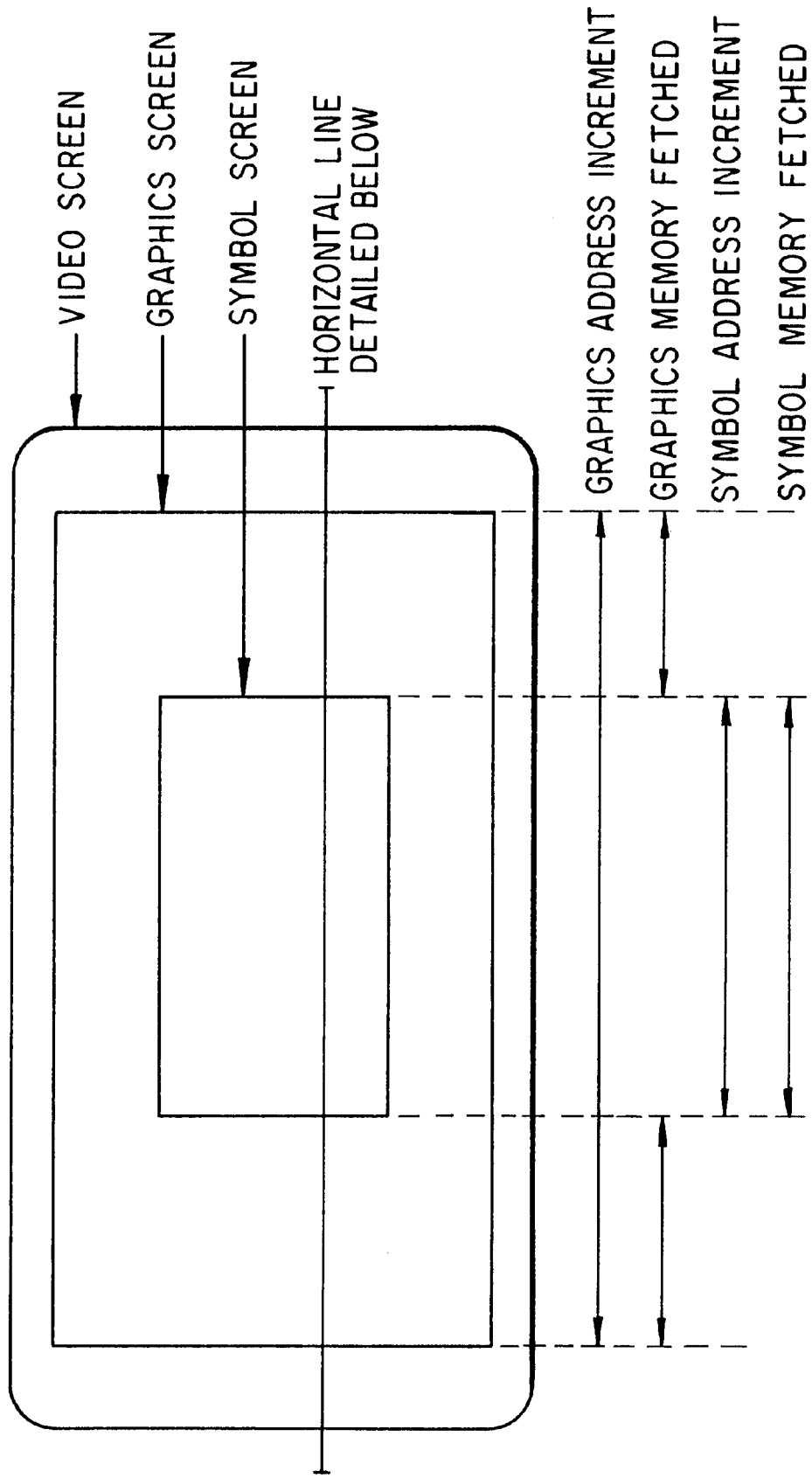
Figure 8:
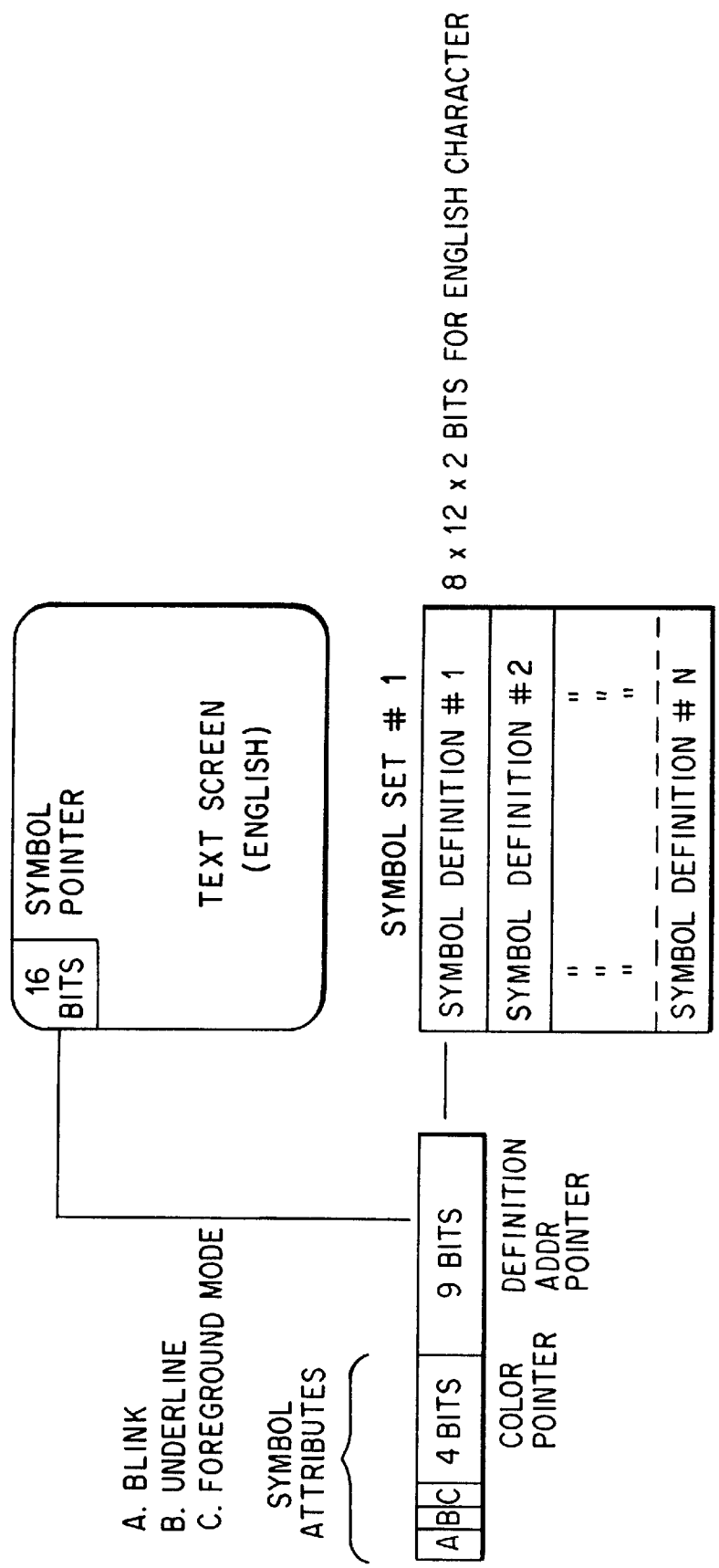
FIG. 8 is a pictorial representation of a pointer of the symbol screen definition section of the display memory.

Referring to FIG. 2, a detailed block diagram of one of the subscriber terminals, for example, the one indicated as 40 of the subscription television system will now be described. The broadband television signal from signal distribution system 52 is received at the input of up/down converter or tuner 100. An out-of-band data receiver 150 is also coupled to the broadband input. Conventionally, the up/down converter 100 may include an input filter, such as a diplexer, to separate the 108.2 Mhz out-of-band signal and the broadband television signal. The up/down converter 100 can be tuned to a predetermined channel for receiving in-band video and audio data when not in use. The channel may be predetermined from the system manager 12 and, by one of the data transmission methods described herein, the predetermined channel identification can be stored in subscriber terminal 40.

When in use, the up/down converter 100 is tuned according to a channel entered by a subscriber via a user interface having an IR receiver 124, remote control 126 and terminal keypad 122. Up/down converter 100 uses a phase locked loop under the control of a tuning control 102 to convert the selected or predetermined default RF channel signal to a 45.75 Mhz intermediate frequency signal. A multifunction control circuit (MCC) 104, preferably an application specific integrated circuit (ASIC) combining many subscriber terminal control and data handling functions into a single package, is linked to up/down converter 100 by a bidirectional link to the tuner control 102. The link has one path for tuning and a return link for feedback control of the tuning process. A feedback signal for automatic gain control and one for automatic frequency control are transmitted to the up/down converter 100 through filters 101, 103, respectively from a video demodulator 109.

A filter, such as a SAW filter 106, filters the IF channel signal to split the signal into separate video and audio portions for further processing. The video portion is demodulated and descrambled by the video demodulator 109 under the control of a descrambler control 110 of the MCC 104. The video demodulator 109 performs the sync restoration (descrambling of the video signal) for sync suppression scrambling. The video signal then passes through a band pass filter 130 and to a video inverter 132 where inverse video inversion (descrambling) takes place. The descrambling of the video portion, whether sync suppression, sync inversion, video line inversion, etc. is under the control of the descrambler control 110 of the MCC 104. The descrambler control 100 provides the necessary timing signals, inversion axis levels, and whether the video is inverted or not to the video inverter 132 and supplies the necessary timing, restoration levels and identification of sync pulses to be restored to the demodulator 109. The descrambler control 110 usually receives such descrambling information from pulses as in-band audio data.

In the other path, the audio signal is converted from the 41.25 Mhz IF carrier to the intermediate frequency of 4.5 Mhz by a synchronous detector 105. Feedback for automatic gain control of detector 105 is supplied from the output of band pass filter 131. The audio signal may then be demodulated by an FM demodulator 119. An amplitude modulation detector 111 performs pulse detection to recover the in-band audio data which are amplitude modulated onto the audio carrier. The recovered in-band pulses are supplied to an in-band audio data decoder 117 of MCC 104 for processing after being shaped by pulse shaper 115. The in-band data, except for descrambling data, is stored in DRAM 137 for buffering. Descrambler control 104 accesses descrambling data directly for the video descrambling operation.

Volume control of the audio signal is performed under the control of a volume control 118 of the MCC 104 and the microprocessor 128 as described in U.S. Pat. No. 5,054,071, incorporated herein by reference. After volume control, the audio signal is passed through a low pass filter 123 and a mute switch 125. The output of the mute switch 125 is applied to a modulator 142.

The MCC 104 receives the video signal after demodulation and descrambling and detects the in-band video data from the VBI of the signal with a VBI decoder 129. The in-band video data is transmitted at a frequency on the order of known teletext systems, such as about 4.0 megabits per second, and a data clock provides an appropriate sampling frequency higher than the Nyquist rate according to well known techniques. The in-band decoder 129 stores the data in DRAM 137 prior to processing by the microprocessor 128, the DRAM 128 serving as a data buffer.

The output of video inversion circuit 132 is also supplied to an on screen display control 127 of the MCC 104. The on screen display control 127 selectively generates on screen character and graphic displays in place of or overlaid on the video signal. The modulator 142 combines the video signal from the output of the on screen display control 127 and the audio signal from the output of the mute circuit 125 and converts the combined signal to the channel frequency selected by the microprocessor 128, such as channel 3/4 for NTSC. The combined and remodulated signal is supplied as an RF output to a television receiver in well known manner.

A control microprocessor 128 controls the overall operation of the subscriber terminal 40. The subscriber communicates to and controls the microprocessor 128 through an interactive user interface with an on screen display.

The user interface includes a keyboard 122 on the front panel of the subscriber terminal 40 and the remote 126 which generate subscriber control signals for channel tuning, volume level control, feature selection, and the like. These subscriber control commands are decoded by an input scanner and control 148 of MCC 104. The remote IR receiver 124 of the user interface receives the commands from the infrared (IR) or other remote control 126, as is well known in the art, and provides commands to the microprocessor 128. The user interface additionally includes a 4 digit, 7 segment LED display 120 which displays the tuned channel numbers and diagnostics.

When the keypad 122 or IR remote control 126 is utilized to select a command, the microprocessor 128 operates to execute the command. For example, this operation may be to instruct the tuner control 102 to appropriately control up/down converter 100 to tune a selected channel. The subscriber terminal interacts with the subscriber by providing numerous on screen displays which assist in the operation of the terminal. The on screen displays provide information and prompts to guide the subscriber through many of the complex features of the terminal.

The descrambler control 110 of the MCC 104 utilizes recovered descrambling data to generate appropriate control signals, for example, inversion control and equalizing, sync restoration or regeneration for descrambling, or otherwise restoring the input baseband television signal. A secure microprocessor 136 determines whether the descrambler control 110 of MCC 104 carries out descrambling on a particular channel or what form of descrambling is required at a particular time by interpreting the authorization and control data downloaded from the system manager 12 (by any of the three data transmission schemes discussed herein, out-of-band, in-band audio or in-band video) into the internal NVM memory of the device. The non-volatile memory (NVM) in the secure microprocessor 136 stores secure data, for example, authorization data, scrambled channel data, scrambling mode data, some terminal configuration data and other required data.

The control microprocessor 128 operates by running a control program which preferably is partially stored in a read-only memory internal to the processor and partially stored in a non-volatile memory such as Flash EPROM memory 134. In addition, the control program of the control microprocessor 128 may also reside in the non-volatile memory of an expansion card 138. The microprocessor 128 communicates with the non-volatile memory 134 and 138 via a memory bus 141 which has data, address, and control lines. In addition, the microprocessor 128 controls the data decoders 117, 129 and 146 and the tuner control 102, volume control 118, on screen display control 127, descrambler control 110 and input key scanner and control 148 via commands through MCC 104 and control microprocessor bus (CMB) 131. The microprocessor 128 also directly controls the mute switch 125 and the output frequency selection of the modulator 142. The microprocessor 128 includes additional capacity for other auxiliary device communications and control through a data port 140.

The memory control 112 permits data coming from the three data decoders 117, 129 and 146 to be placed in a volatile memory such as DRAM 137. There it can be accessed by the control microprocessor 128 via the CMB 131. The MCC 104 also distributes control instructions from the control microprocessor 128 to the other parts of the MCC 104 to provide operation of the rest of the subscriber terminal 40. The MCC 104 additionally connects to a secure microprocessor bus (SMB) 143 which permits communications between the secure microprocessor 136 and other portions of the subscriber terminal 40. The SMB 143 is further coupled to the expansion card 138 to provide renewable security.

The memory control 112 and microprocessor interfaces of the MCC 104 are the central communications facility for the control microprocessor 128 and the secure microprocessor 136. The memory control 112 receives requests to write to memory or read from memory from the microprocessors 128, 136 and the other controls and data decoders. It resolves contentions for memory transfers, giving priority to real time applications and the microprocessors, and schedules the data flow. The microprocessors 128 and 136 communicate through internal registers of the MCC 104 with the memory control 112 and other portions of the MCC.

The expansion card 138 is a printed circuit card which contains memory and/or secure microprocessor components, which can be plugged into a connector (not shown). The connector electrically extends the control microprocessor memory bus 141 and the secure microprocessor bus 143 to the expansion card 138. Additional program or data memory, or renewed security can be provided by the expansion card 138.

The subscriber terminal may optionally include an impulse pay-per-view (IPPV) module of either the telephone type 152 or the RF-IPPV type 154. The IPPV module allows the subscribers to request authorization of their subscriber terminal 40 to receive pay-per-view events, store the data associated with the purchase of the event in the non-volatile memory of the secure microprocessor 136, and then transmit the data to the system manager 12 via the telephone return path or the RF return path via the signal distribution system 52.

The on screen display system will now be more fully described beginning with reference to FIGS. 3–10. In FIG. 3, each on screen display can be generated as an array of pixels having up to 320 vertical columns and 200 horizontal rows. The 200×320 pixel size is chosen to generate adequate resolution for a standard NTSC receiver. Of course, other video formats, such as the several PAL formats, can be supported by adding additional rows and columns. Additionally, different sized pixels forming other display areas can be provided for any television signal format. Each on-screen display is generated by the display controller 127 by producing analog pixels for the horizontal scan lines of the screen of the television receiver of the subscriber. The display controller 127, under the command of the control processor 128, controls the time of such display and which display to produce on the screen of a receiver.

The on screen display processor 127 operates on a video field by video field basis. A display screen is formed from display attributes and stored display data describing the screen or field in terms of pixels. This field can then be displayed in a noninterlaced form for nonvideo purposes or mixed in an interlaced form with active video. The field can be displayed many times to produce a static display, or the display parameters and display data can be changed to produce varying images. In either case, the on-screen display is activated by a command from the control processor 128 and will continue to display a screen which is stored in the display memory until disabled by the control processor. This produces a particularly advantageous system when the control processor 128 and display processor 127 can operate in parallel without completely monopolizing control processor resources.

In this display environment, three types of display modes can be produced including a text or symbol screen mode, a graphics screen mode, and a combination mode where text and graphics screens can be displayed together. In addition, any of these modes can be used in combination with a border screen mode.

In the text or symbol screen mode, as seen in FIG. 3, the on-screen display is defined as a plurality of symbols, each symbol being of a variable pixel array of size m×n, where m=6, 7 . . . 16; n=6, 7 . . . 32 and m×n≦512. By providing a variable size of symbol, many different types of symbol sets and sizes, such as different character fonts can be realized. Additionally, different foreign language character sets such as Japanese, Arabic, Chinese or others can be easily realized in this manner. A text screen can encompass the entire display array or be any size down to one symbol. Each text screen is defined by a vertical start and stopping point VSTART, VSTOP, and a horizontal starting and stopping point HSTART, HSTOP.

A preferred example for an English character set would be an 8×12 pixel array which would yield a maximum of 16 symbol lines on a text screen display with 40 characters per line. Another preferred example for a Chinese character set would be a 12×12 pixel array which would yield a maximum of 11 symbol lines on a text screen display with 26 characters per line. A plurality of these symbol arrays, each defining a particular character in a character set, are grouped in the display memory to form symbol set definitions, such as English, Chinese, font A, font B, etc. It is evident that the subscriber terminal 40 may store multiple symbol set definitions.

Figure 9:
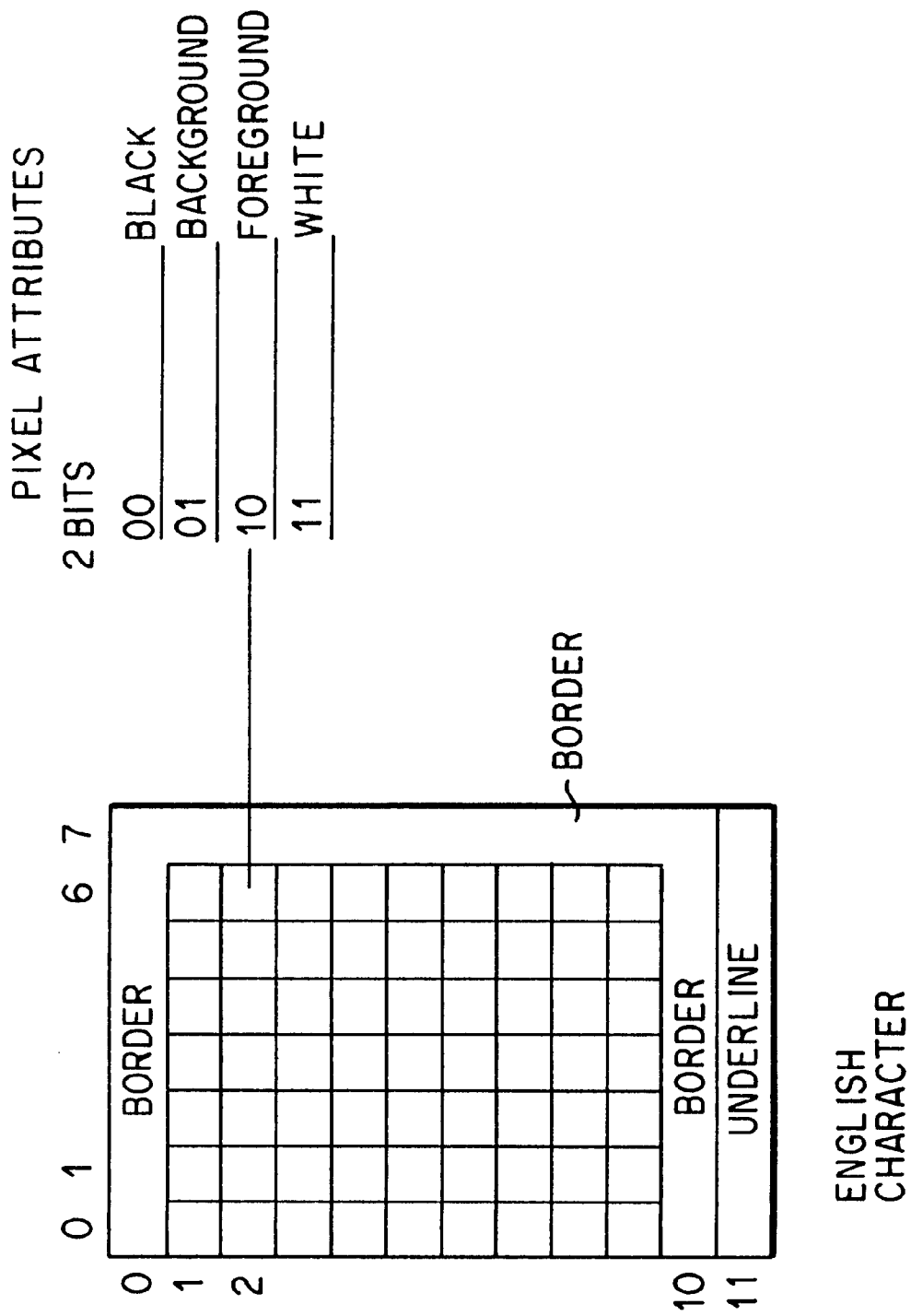
FIG. 9 is a pictorial representation of a generic symbol of the symbol set definition area of the display memory.

An example of a character from an English character set, a 8×12 pixel array, is illustrated in FIG. 9. The character has a 1×8 pixel underline and a 1 pixel wide border around a 7×9 pixel character field. The character is defined by selecting pixels from the character field in a particular pattern. Each pixel of a symbol definition is stored as a 2 bit pixel attribute field which describes one of the four possibilities shown in the table of the figure. Each pixel can be either a foreground pixel, a background pixel, a black pixel or a white pixel.

To build a text screen display, a plurality of symbol pointers (each addressing a selected symbol in a symbol set definition) is stored in the sequence which the characters are to be displayed. For example, if the word LIST is to be displayed on the screen, then successively, the symbol pointers for the English character set elements L, I, S, T would be concatenated. The pointers may further contain symbol attributes for each character as in shown in the example for FIG. 8.

The illustration shows a symbol pointer as a 16 bit word which has a 7 bit symbol attribute field and a 9 bit symbol address. The 7 bit attribute field contains a 4 bit field defining the color of a character. These four bits may select one of sixteen colors of a color pallet register stored for that purpose. The other three symbol attribute bits include one bit to determine whether the character is to blink, another bit to determine whether the character should be underlined, and a foreground mode bit for special effects for the character.

In the graphics screen mode, the display system utilizes the entire 300×200 pixel display as a pixel mapped graphic as seen in FIG. 4. Each pixel can be displayed as one of the sixteen colors of the foreground or background color pallet memory. In the graphics mode, the color is then selected by 4-bits stored for each pixel.

For the combination mode as seen in FIG. 5, both the symbol screen mode and the graphics screen modes are used simultaneously. A graphics screen of less than the full screen is defined and displayed in the normal graphics mode. This display can then be overlapped with a text mode display which does not display in the graphics window area. The reverse is also provided where a text screen can be overlayed on a graphics screen.

The display processor also includes a border screen feature where a border screen of a particular color may be placed around the graphics or symbol screens. The border feature is shown in exemplary form in FIG. 6 where the border pixels are active whenever the graphics screen and symbol screen are inactive and the border screen is enabled.

The color of the border screen is produced by loading a 12 bit color value in a border screen parameters register. The location of the border is set by loading the horizontal starting and ending locations, and the vertical starting and ending locations on the screen. The border screen may be disabled by storing a vertical start number which is larger than the maximum number of lines on a screen.

The display controller receives a number of display parameters which it loads into its control registers to regulate processing of the display function. The first set of display parameters is the screens heights and widths which can be at a maximum the full screen of a 320×200 pixel array and, if less than the full display area, the display screens locations. All those screens which will be active in the display area will have these parameters stored for them. The second set of parameters is a symbol set dimension n×m defining one of the symbol definition sets. As will be more fully discussed, multiple symbol definition sets can be stored and displayed in one screen.

The display system provides an extremely powerful and flexible tool for producing on screen displays for the subscriber terminal. The display system can be used in a text only or a full pixel mapped graphics mode only. The display can be a combination of text with a variably sized and variably positioned graphics window which itself is fully pixel mapped. The screens may be full sized or any smaller defined size for.

For a character or graphics display, thirty-two colors can be programmed for a character or pixels. The color palette registers may be changed to display 16 choices for foreground and 16 choices for background from a 4096 choice color palette. On a per line basis a character set can be changed. On a per character basis selections for background and foreground color are available. Moreover, characters may take on border, underline, blink and highlight features on a selectable basis.

The display system provides a color palette of approximately 4096 colors which are defined as 12-bit digital words having a 4-bit luminance component, a 4-bit B-Y (blue-luminance) chrominance component, and a 4-bit R-Y (red-luminance) chrominance component. Combinations of these bits allow a user to select a wide variety of colors. Of course not all 4096 combinations of 12 bits will define useful colors, but there are a great number of useful hues and tints available.

Figure 10:
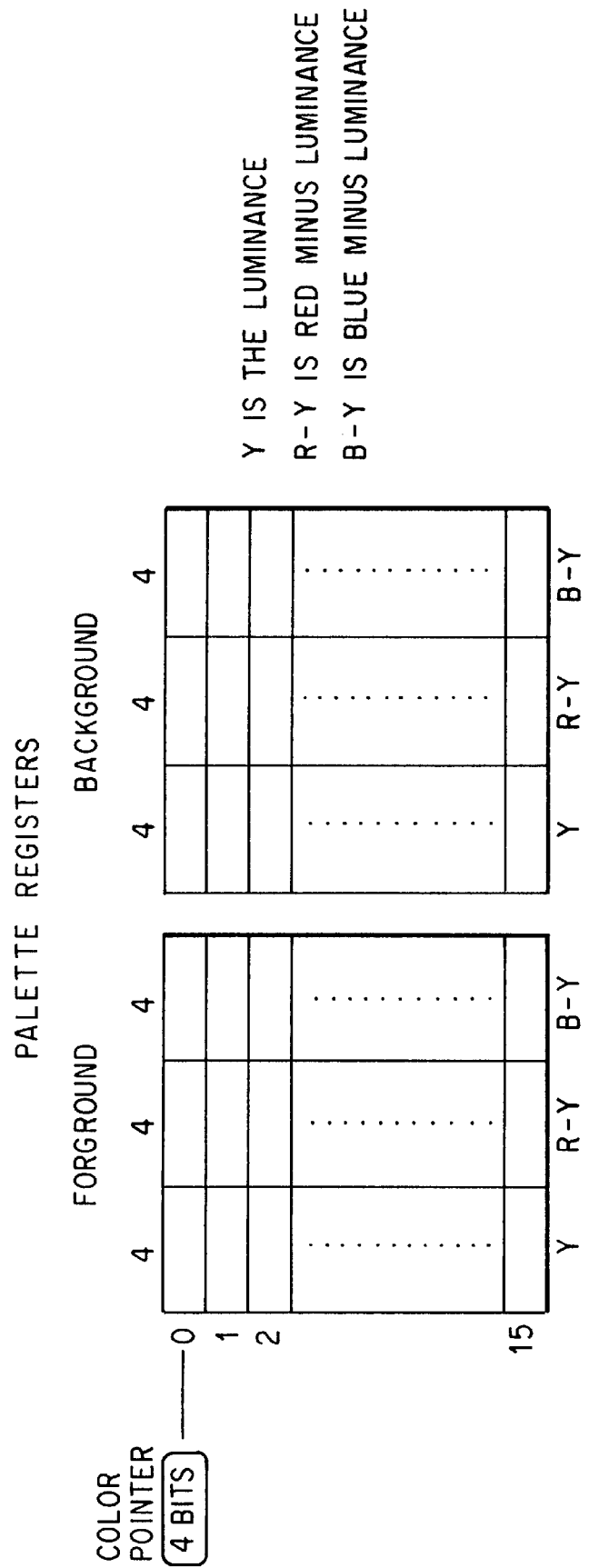
FIG. 10 is a pictorial representation of the palette registers used in the color selection for symbol.

The digital processor contains a plurality of palette registers as shown in FIG. 10 into which these colors can be stored. Any thirty-two of the colors can be stored at one time, as there are sixteen background color registers and sixteen foreground color registers. The system uses a 4-bit pointer to select one out of the sixteen colors for both foreground and background by pairing the registers. This feature is useful in providing a plurality of letters of one chosen color on a chosen background color, for example blue letters on a white background. This configuration can be programmed easily by the same color pointer for all letters indicating a palette register pair having a blue color loaded into the foreground register and a white color loaded into the background register.

Figure 11:
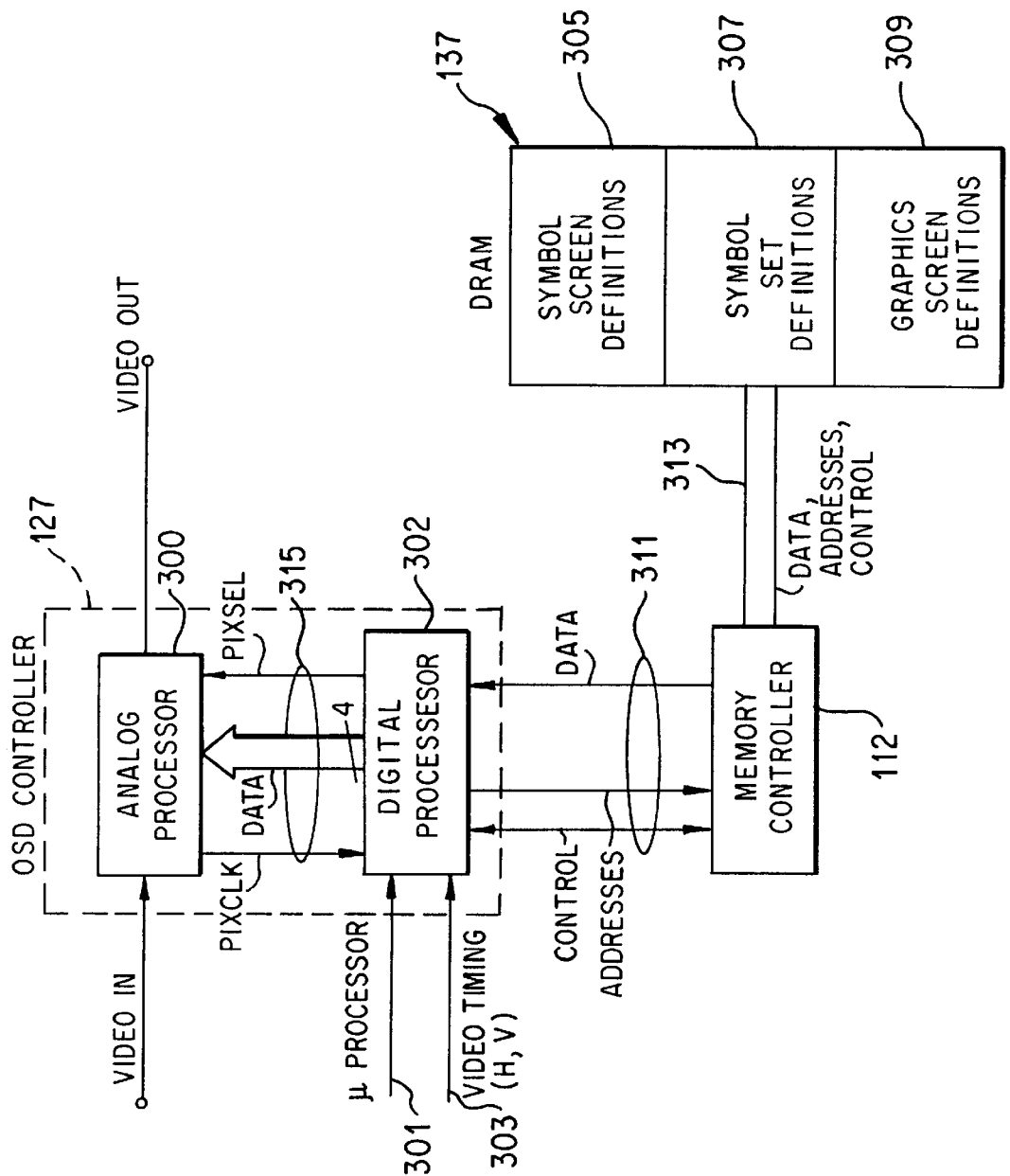
FIG. 11 is a functional block diagram of the display controller illustrated in FIG. 2 and a pictorial representation of the display memory partitioned into a symbol screen definitions section, a symbol set definitions section, and a graphics screen definitions section.

A system block diagram of the on screen display controller 127 is more fully illustrated in FIG. 11. The on screen display controller 127 operates under commands from the control microprocessor 128 to provide on-screen displays for the subscriber terminal in the form of text screens, graphics screens, or combinations of text and graphics screens. The on screen display controller 127 comprises a two part display processor including an analog processor 300 and a digital processor 302.

The digital processor 302 receives commands and configuration data from the control microprocessor 128 over a bus 301 and video timing data 303 from the VBI decoder 129 indicating the start of each horizontal line and the start of each vertical field. The digital processor 302 uses the display parameters from the control microprocessor 128 to access display information in the DRAM 137 for the particular on screen display which is to be generated. The on screen display may be only text, and, in that instance, the symbol screen definition portion 305 and symbol set definitions 307 portion of the DRAM 137 are accessed. If the on screen display is only graphics, then the graphics screen definitions portion 309 of the DRAM 137 is accessed. If a combined screen of text and graphics is needed, then all three portions 305, 307, and 309 of the display memory are accessed.

The digital processor 302 accesses information in these portions of display memory on a nybble by nybble basis. It fetches data from the DRAM by its connections to the memory controller 112 through control lines, address lines and data lines 311. The digital processor 302 requests data from the DRAM 137 by providing a calculated starting address, number of memory locations accessed, and control commands to the memory control 112, and the data is returned over the data lines 311 and 313. The digital processor 302 processes this data to convert it into a series of digital words, each indicating the luminance and chrominance values of a pixel for the on screen display. These digital words which represent analog pixels, along with appropriate timing signals, are sent from the digital processor 302 to the analog processor 300 over timing and data lines 315.

Figure 12:
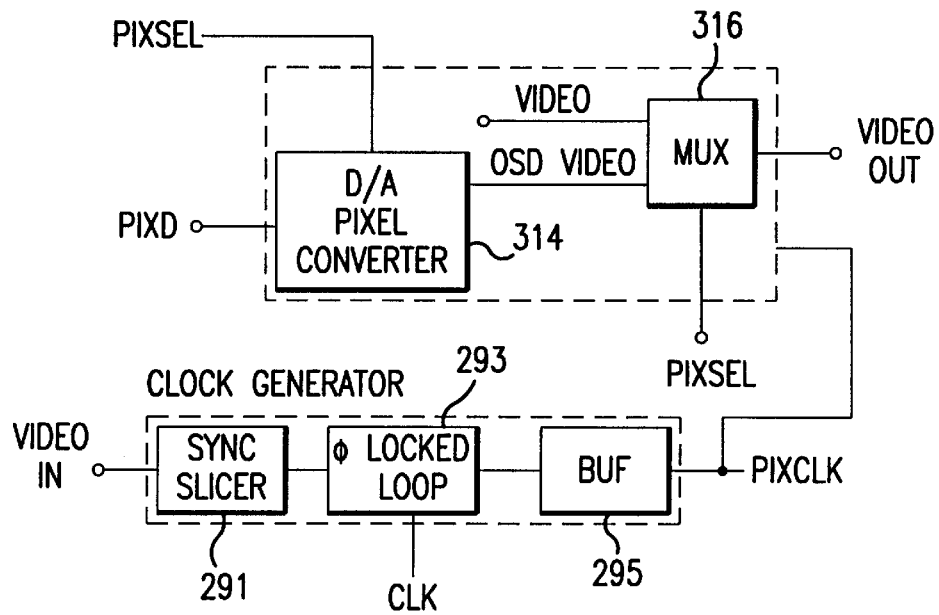
FIG. 12 is a detailed block diagram of the analog processor illustrated in FIG. 11.

As better illustrated in FIG. 12, the analog processor 300 includes a conversion means 314 to convert the digital pixel words to analog pixels. The analog processor 300 also receives the incoming video signal VIDEO IN, after its demodulation, and inputs the signal to one part of an analog multiplexer 316 which can select on a pixel by pixel basis, either analog pixels from the VIDEO IN signals or analog pixels from the digital to analog pixel converter of the analog processor 300. The analog processor 300 selects which pixel to output based on a pixel select signal PIXSEL. The digital processor 302 generates the pixel select signal PIXSEL based upon whether the display processor is enabled and is outputting a valid color definition.

Figure 13:
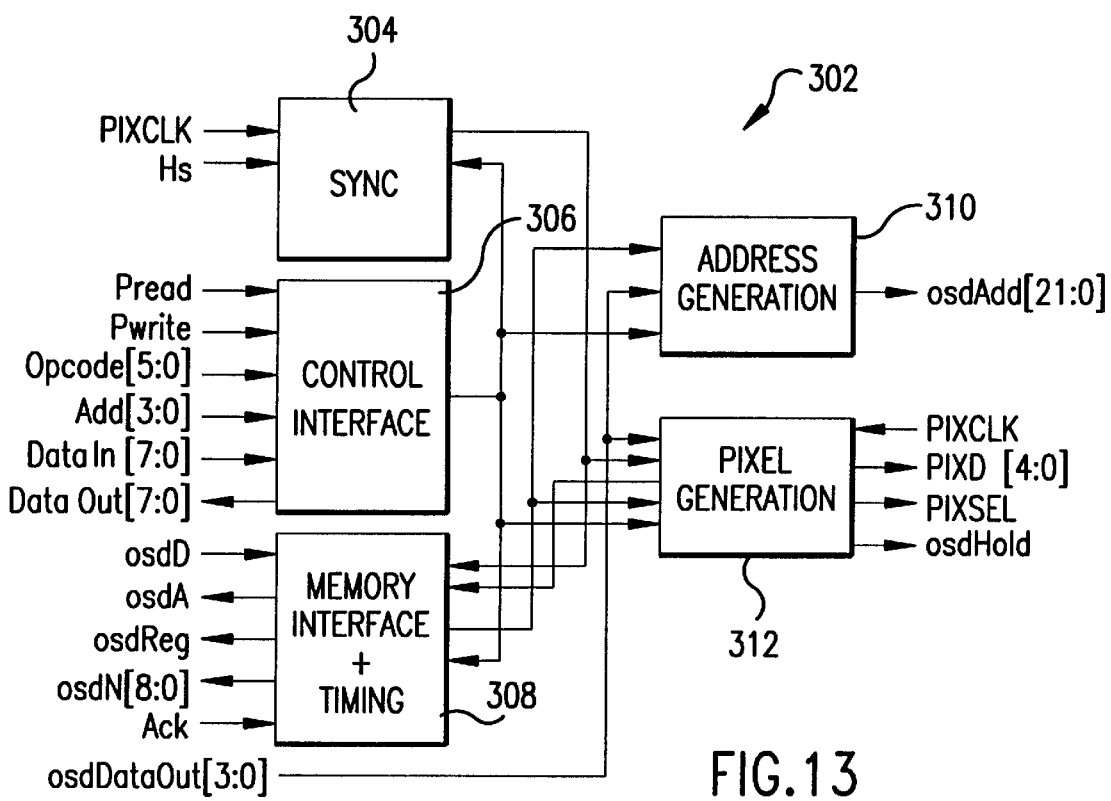
FIG. 13 is a detailed pictorial representation of the registers which can be configured in the display controller illustrated in FIG. 11.

Also with reference to FIG. 13, the digital processor 302 causes the pixel select signal PIXSEL to choose the VIDEO IN signal if both of these conditions are not met. The multiplexed output is then output to the modulator 142 as the VIDEO OUT signal. The analog processor 300 further generates the pixel clock signal PIXCLX from a oscillator clock CLK. This is the basic training signal of the display processor and divides a horizontal line with 455 pixels of a duration of approximately 139 nanoseconds each. If the pixel clock is needed for display during a time when no VIDEO IN signal is tuned by the subscriber terminal, then it is generated directly from the oscillator clock signal CLK. This is a so called internal video mode. If the pixel clock is used for a display where the video signal is present, then it is generated by phase synchronization with the horizontal sync of the VIDEO IN signal by a sync slicer 291 and a phase locked loop 293.

Figure 14:
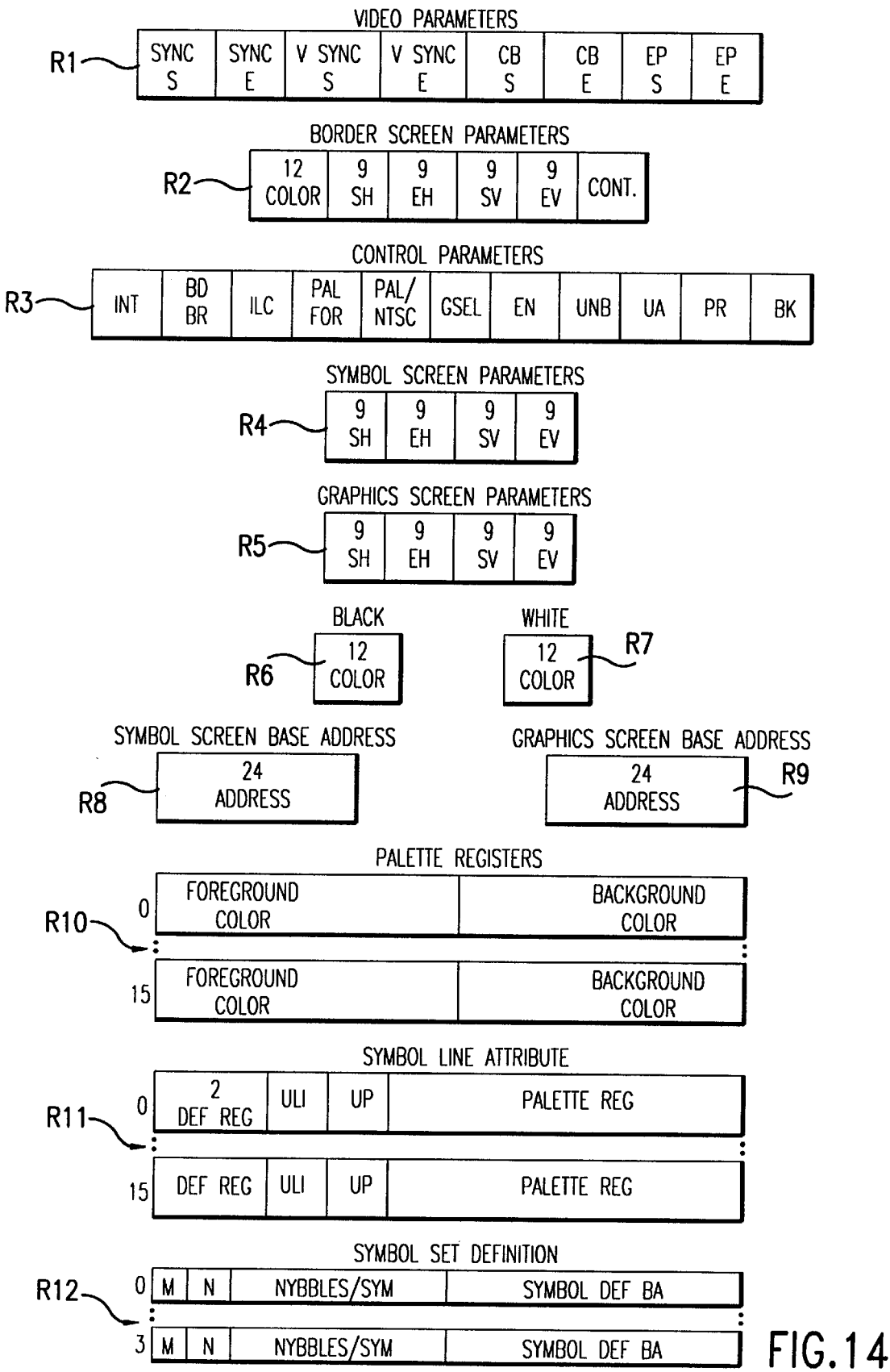
FIG. 14 is a pictorial process flow chart of the communication display transactions and the variation of display data and display attributes in the display system.

The digital processor 302 is controlled by the control processor 128 by reading and writing the registers R1–R12 shown in FIG. 14. The display attributes for the on-screen display can be controlled by loading and reading particular registers in the digital processor 302.

The type of screens which can be displayed and their location on the display area of the television receiver are provided by a border screen parameters register R2, a symbol screen parameters register R4, and a graphics screen parameters register R5. All of the screen registers have information concerning the horizontal starting point (SH) and stopping point (EH) and the vertical starting point (SV) and stopping point (EV) of each of the respective screens.

A symbols screen or graphics screen can also have associated with it the starting memory locations of where the display information is stored in DRAM 137. This information is loaded into the symbols screen base address register R8 for the symbol screen, and the graphics screen base address register R9 for the graphics screen. Because the border screen is generated internally and not stored in the DRAM 137, register R2 also contains a 12 bit digital word describing the color of the border screen. All pixels of the border screen are generated from this color.

To activate the symbol screen, the graphic screen or the border screen, the starting address of the screen must be within the display area limits. Conversely, to deactivate any of the screens, the vertical starting address of a respective screen is set to a line number outside the display area. A control bit CONTR is used in register R2 to enable and disable the function of the screen border.

The colors for a selected pixel of a screen can be chosen by one of the color registers R6, R7 and R10. There are sixteen foreground palette registers and sixteen background palette registers R10, a black color register R6, and a white color register R7. Each of these registers is capable of storing a 12 bit color as described for the palette section, 4 bits of luminance and 4 bits each of the two phases of chrominance.

There are two sets of registers R11 and R12 which provide control of the symbol line attributes. Each symbol line in a symbol screen display can be of a different font or style which is defined as a symbol set definition in the display system. There are up to sixteen symbol lines, and each of these can have a number of line attributes which are stored in sixteen symbol line attribute registers R11. The first field of a symbol line attribute register is the address of one out of four symbol set definition registers R12. The second field is a one bit line attribute, which selects either the foreground or background color for the underline color. The particular color palette register chosen is then described in a 4-bit field, palette register. Additionally, a special effects bit ULI for inverting the luminance for the underline is provided where, if the bit is cleared, the luminance of the underline is provided normally, and if the bit is set, the intensity of the luminance of the underline is inverted.

The two bit symbol line definition in the line attribute register R11 selects one out of four symbol set definition registers R12. Each symbol set definition register R12 stores the size of a particular symbol set, m×n, the number of nybbles in a symbol, and the symbol definition base address. Registers R12, along with the symbol line attribute registers R11, allow up to four different types of symbol set definitions to be used simultaneously in the display system.

The last two registers that are provided are for control and selection of different functions of the display processor. The first is a video parameters register R1 and the other is a control parameters register R3. The video parameters register R1 defines the control timing of the particular video signal that is to be generated by the display processor. The horizontal sync start time SYNC S and end time SYNC E are stored along with the vertical synchronization start time VSYNC S and end time VSYNC E. Also defined are the color burst start time CB S and end time CB E. To time the vertical blanking interval, the equalizing pulse start time EP S and end time EP E are also stored in the video parameters register R1.

The control parameters register R3 is a two byte register which stores a number of control bits choosing the modes and features for the display processor. The blink rate BR for symbols and underlines is stored in increments of 0.25 seconds from 0–4 seconds. The blink duty cycle BD can be set with two bits indicating duty cycles of 25%, 50% or 75% on and conversely 75%, 50% or 25% off. The blank screen bit BK can be used to blank a screen, if set to 1, or to display the screen normally, if set to 0. Further, an internal/external selection bit INT is used to determine whether the video signal is to be internally generated, if set to 1, or synchronized to the external video signal, if set to 0.

If the signal is being internally generated and is not being synchronized to an interlaced video signal, then an interlace control bit ILC can be set for non-interlaced fields or cleared for interlaced fields. Two further fields, PALFOR and PAL/NTSC, are used to select either the NTSC or PAL format and, if PAL format, the type of PAL format which is to be selected. The bit GSEL is used to select whether the color palette for graphics is the foreground palette or the background palette. The control bit EN is used to enable the on screen display controller or disable the on screen display controller. The underline blinking bit UNB indicates whether the underline of a symbol will blink or not blink. Four bits for an upper address field UA are used to allow the digital processor 300 to extend the size of DRAM 137 which it can normally address. The control bit PR is used to indicate whether a symbol screen has priority over a graphic screen, or if the graphic screen has priority over the symbol screen.

To display a screen, a screen display routine from the executable code is called for execution by the control processor 128. The screen display routine will move the particular screen information which it is programmed to display from the nonvolatile memory (ROM or flash EPROM) to the display memory area of DRAM 137. The screen display program can then disable the digital processor 300 by clearing the enable bit EN to load the processor registers R1–R12 with the desired display attributes. Normally, the screen display routine will only disable the display of the digital processor 1302 by setting the blank bit BK if it needs to only reload the palette registers or line attribute registers.

The control processor 128 need not load all the processor registers because it can read them to determine if any changes are actually needed. For example, once the video parameters register R1 and most of the control registers R3 have been programmed once, they will not often need to be changed. Likewise, the color registers R6, R7 and R10, after they have been set up with the desired palette of colors, will remain relatively unchanged for many display scenarios. Moreover, because four different symbol set definitions or fonts can be used simultaneously, the line attribute and symbol set definition registers R11 need not be changed for every scene change.

The most likely registers to be changed are the registers R8 and R9 to indicate to the digital processor 300 where the screens are to found in the DRAM 137. The next most likely registers to be changed are the screen parameter registers R2, R4 and R5 which position the different screens on the display area.

After the control processor 128 has set the display attributes in the registers R1–R12 to the desired display configuration, it will re-enable the digital processor 300 by setting the enable bit EN or clearing the blank bit BL to display the stored screens until the device is thereafter again disabled, or the display information or the configuration information is changed.

Figure 15:
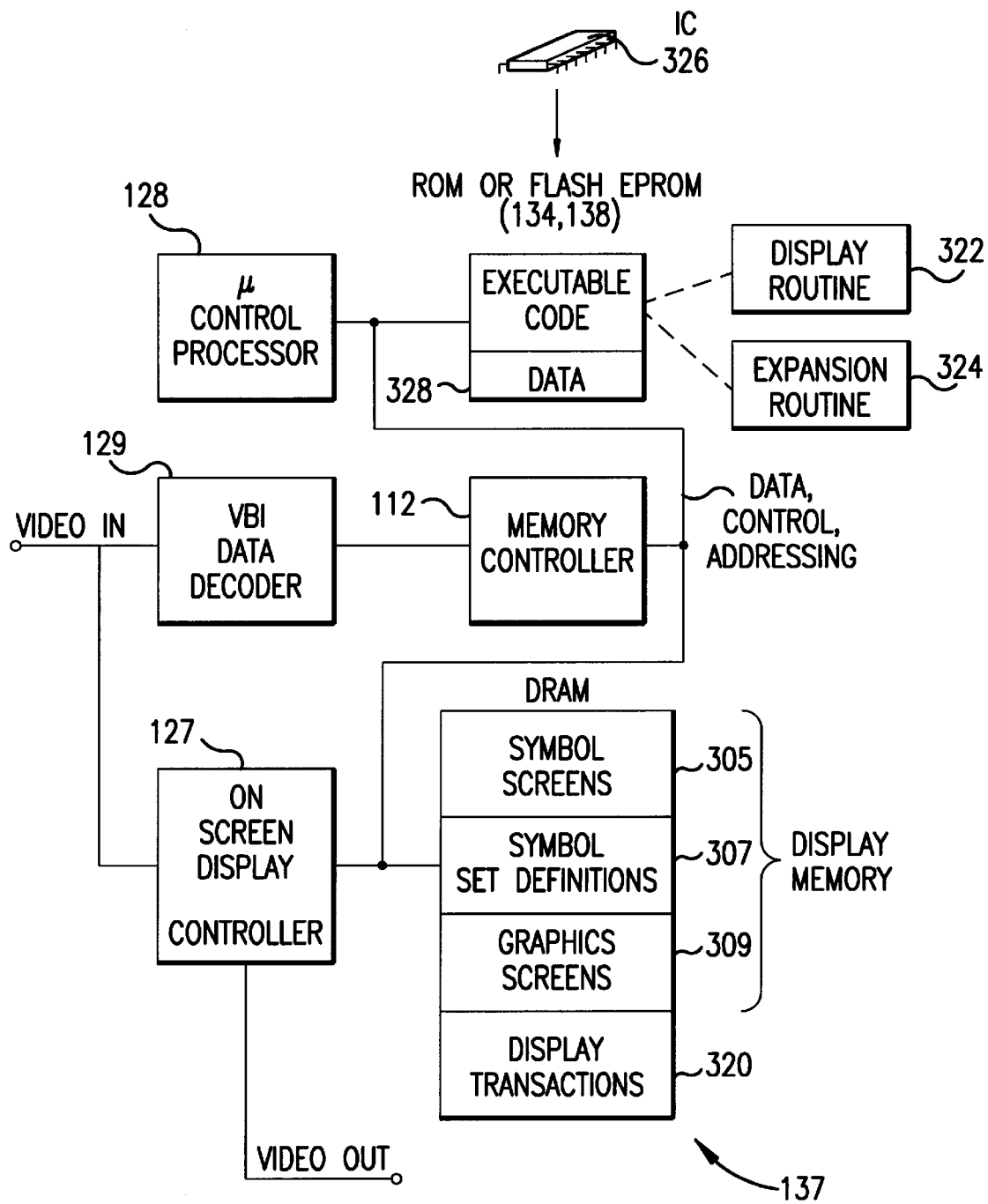
FIG. 15 is a pictorial representation of a display transaction.

With reference to FIG. 15, the on-screen display information and display attributes are stored in the data portion of the ROM or Flash EPROM memory 134, 138 of the subscriber terminal. A display routine 322 loads the on-screen display controller 127 with the display attributes, and the display memory portion 305, 307, and 309 of the DRAM with the data which actually forms the display.

The display information and display attributes can be varied in the ROM or Flash EPROM 134, 138 in a number of ways. The ROM or Flash EPROM IC chips may be replaced with reprogrammed IC chips 326. Alternatively, the nonvolatile memory in which this data is stored can be on plug in modules, such as those shown as 138 in FIG. 2.

In yet another alternative, the display control information can be changed by downloading to them from the system manager of the headend to the non-volatile memory 134, 138 with other executable code and data. This is accomplished via download program code transactions as described in the parent application of Bacon, et al.

Another alternative is to provide a specified display transaction from the system manager of the headend. The display transactions are received over the distribution system and input to the subscriber terminal as a part of the vertical blanking interval data. The VBI data decoder 129 strips the VBI data from the tuned channel of the video and communicates with the memory controller 112 to temporarily buffer the display transaction data in area 320 of the DRAM 137.

The VBI data decoder 129 recognizes the display transactions as on-screen display data and display attributes, and buffers them in the portion 320 of DRAM 137 reserved for that purpose. Periodically, the control processor 128 will test a software flag to determine if any display transactions have been stored in the display transaction 320 area of the DRAM 137. When a display transaction has been stored, the control processor 128 will then call an expansion routine 324 which accesses the display transaction in DRAM 137 through the memory controller 112.

The expansion routine 324 will decode a command in the display transaction and with the parameters data provided in the transaction proceed to either change the display attribute data or expand the parameter data into on-screen information. The resulting data is stored in the data portion 328 of the Flash EPROM 134, 138. The control processor 128 may then call a display routine 322 to display this new on-screen data and display attributes in the same manner as other on-screen data and attributes.

The expansion routine 324 is a group of specialized sub-routines which are tailored to the commands of the display transaction to translate the high level commands of the transaction, into the specific on-screen display language of the display processor. The commands can be viewed as high level sub-routine calls for certain utility functions of the display processor.

In this manner the on-screen display transactions communicate a high level screen building language which allows a programmer from the headend of the subscription television system to change the on-screen displays of the subscriber terminals in a facile manner. Instead of having to program in the specific display language of the display controller, a programmer may compress these functions into a high level language describing the screen functions that he desires displayed.

The on-screen display transaction is shown in FIG. 16. The display transaction is generated similarly to other communication transactions in the subscription television system. FIG. 16 illustrates the basic format for a display transaction. The transaction has a header, bytes 0–6, which describe to the data decoders of the subscription television system information regarding the processing of the transaction. Byte 5 describes the transaction as a display transaction with a unique transaction code. In byte 0 of the header, several bits are set to label the transaction for global or addressed reception, and whether the transaction will be sent on the audio or VBI data channels. Bytes 1–3 are descriptors, if it is an addressed transaction, of the destination terminal and other information. The descriptors of a display transaction may associate a number of display transactions with a single screen or group of screens which are accessed by a display routine using that descriptor, for example, display screen #35.

The header is continued in byte 6 where a sequence number from 000000 to 111111 indicates which transactions should be grouped together. A last sequence bit is set in byte 6 when the final transaction of a sequence has been sent. The actual display data or the display attributes for a display transaction are stored in bytes 7–21 of the message.

With the display transactions any combination of display attributes and display data can be sent from the system manager to all of the subscriber terminals or any one of them. The symbol set definitions can be changed, deleted, or added to with this method to produce various screens without changing the screen definitions. The color palettes, the line attributes, and the symbol definition registers can be varied to produce great flexibility in configuring these displays.

While display transactions can be used to communicate display information and display attributes in the format and language of the display processor 127, it is much more advantageous to build screens from a higher level language. This allows less data to have to be transferred by the transaction and more efficiently uses the communications resources of the subscriber terminal. Further, because the programmer is removed from the result of his actions, it is more certain that mistakes will not be made as the language is descriptive of the function being performed in the display. This makes the programming interface to the on screen display system much more user friendly.

In one preferred embodiment of a high level display transaction language, a command describing a function to be performed on the screen is accompanied by data parameters describing the variables of the function. The Appendix lists a plurality of these command and parameter combinations which form a display screen language.

With reference now to the Appendix, a command byte equal to zero indicates that there are no more display transactions for building a particular screen. This transaction usually follows a series of transactions which have described a particular screen. This transaction allows the expansion routine to completely describe one particular screen before ending the transactions at this point.

A command byte equal to one indicates that a color should be loaded into one of the color palette registers. The transaction identifies the particular register pair, and supplies a foreground color and a background color for that register pair.

A command byte equal to two indicates that a line attribute register should be changed. The transaction indicates the one out of sixteen line attribute registers to be changed and the information to be loaded therein. Each line attribute register contains a palette register pointer, a control bit and a pointer to the symbol set definition registers. A special register indication (FF) indicates that all of the line attribute registers should be set to the parameters in the transaction.

A command byte equal to three indicates that the border screen register should be loaded with a particular color. The color combination of Y, B-Y and R-Y to be loaded is provided by the parameter data section of the transaction.

There are additionally several commands which apply to entire screens including commands 4, 5, and 6. A command byte equal to four indicates that an entire screen should be filled with a particular character. The data portion of the transaction indicates which character should be used to fill the entire screen. A command byte equal to five indicates that all of the symbols of a particular symbol screen should have the same attributes. The attributes which are the most significant seven bits of the symbol pointer, are stored in the transaction and loaded for all symbol pointers of a particular screen.

A command byte equal to six indicates that an entire screen should be filled with a particular character that have the same attributes. The expansion routine takes the character information from the transaction and loads the least significant nine bits of the symbol pointers of an entire screen with the character and the most significant seven bits of the symbol pointers with the attributes stored in the transaction. It should be evident that when using the commands 4, 5 and 6 that the symbol set definition (line attribute definition command) should be sent with one or more of these commands to define the symbol set.

The command byte equal to seven indicates that the display processor should write n characters to the on-screen display. The parameters data of the transaction indicate the row and column of where to start the characters, and subsequent data of the transaction indicate the number of characters (n) and a list of the characters to be displayed.

In a similar manner, a command byte equal to eight will cause an attribute to be written to n symbols on a display. The data stored in the transaction indicate the starting row and column of the attributes, the number of times to write the attributes and which attributes should be given to the symbols.

A command byte equal to nine will cause a single character to be written to on-screen display n times. The information stored in the transaction includes the row and column of the on-screen display of where to begin writing the character, the number of times n to write the character and which character is to be written.

A command byte equal to ten will cause n characters to be written to a screen display with common attributes. The parameters data of the transaction include the row and column of the on-screen display to start the writing of the n characters, the number of n characters to write, the common attributes for each of the characters, and a list of the characters.

A command byte equal to eleven will cause n characters to be written to a screen display with n different attributes. The parameters data of the transactions includes the row and column of the on-screen display to start the writing of the n characters, the number of n characters to be written, and a list of the characters and attribute pairs.

A command byte equal to twelve indicates that a number of n characters from the display memory should be put up on the screen. The parameter data for the transaction indicates the position of the row and column where the characters should start and a parameter number indicating the particular parameter to be displayed. The number of n characters is then included as the last byte of the transaction.

A command byte equal to thirteen indicates that all the bytes in the interactive buffer of the DRAM 137 should be set to a particular value, the particular value, and a set of identification values.

A command byte equal to fourteen indicates that an on-screen display should pause for a time out by looking for a select key press from the remote control of the subscriber terminal before transmitting the information to the DRAM interactive buffer. The parameter data includes the duration of the time out.

A command byte equal to fifteen causes the cursor of the on-screen display to position itself at an underline which is blinking. The command also causes the control processor to an interactive character, and set a character time-out. The parameters for this transaction are the row and column values of the underlined symbol, the high and low value for a valid character, the duration of the time-out and a offset number for storing the interactive character and in a buffer.

A command byte equal to sixteen indicates the control processor expansion routine should processes the transaction as a no operation function. This function may be used for spacing display transactions and to provide default conditions for logical branches where the one branch is not functional.

While there has been shown and described the preferred embodiments of the inventions, it will be evident to those skilled in the art that various modifications may be made thereto without departing from the spirit and scope of the invention as set forth in the appended claims and their equivalents.

APPENDIX

```
/*********************************************************************
*                                                                    *
*       DONE- NO MORE COMMANDS                                       *
*                                                                    *
*********************************************************************/

BYTE NUMBER                      CONTENTS
       -----------                      --------
            1                           COMMAND = 0

/*********************************************************************
*                                                                    *
*     osd_write_pallette_register-write foreground/background b-y, r-y, y to  *
*                           pallette register                        *
*                                                                    *
*          parameter:                                                *
*                   register (0–15)                                  *
*                   foreground color                                 *
*                   background color                                 *
*                                                                    *
*********************************************************************/

BYTE NUMBER                      CONTENTS
       -----------                      --------
            1                           COMMAND = 1
            2                           pallette register number
           3–4                          foreground color
           5–6                          background color
```

APPENDIX-continued

```
/***********************************************************************
*                                                                      *
*   osd_write_line_attributes_register-write line attribute register   *
*                                                                      *
*       parameter:                                                     *
*               line (0–15, FF means set all to following value)       *
*               parameters                                             *
*                       bits 0–4 = pallete pointer (0–15 foreground,   *
*                                       16–31 background)              *
*                       5 = not used                                   *
*                       6–7 = cube set                                 *
*                                                                      *
***********************************************************************/
```

| BYTE NUMBER | CONTENTS |
|---|---|
| 1 | COMMAND = 2 |
| 2 | line number |
| 3 | parameter (see above) |

```
/***********************************************************************
*                                                                      *
*   osd_set_screen_border_register- set outside border color b-y, r-y, y *
*                                                                      *
*       parameter:                                                     *
*               border color   (border on = 1  off = 0 is bit 12)      *
*                                                                      *
***********************************************************************/
```

| BYTE NUMBER | CONTENTS |
|---|---|
| 1 | COMMAND = 3 |
| 2–3 | color |

```
/***********************************************************************
*                                                                      *
*   osd_fill_char- fill pointers area with a character                 *
*                                                                      *
*       parameter:                                                     *
*               character                                              *
*                                                                      *
***********************************************************************/
```

| BYTE NUMBER | CONTENTS |
|---|---|
| 1 | COMMAND = 4 |
| 2 | character |

```
/***********************************************************************
*                                                                      *
*   osd_fill_attrib- fill pointers area with an attribute              *
*                                                                      *
*       parameter:                                                     *
*               attribute                                              *
*                                                                      *
***********************************************************************/
```

| BYTE NUMBER | CONTENTS |
|---|---|
| 1 | COMMAND = 5 |
| 2 | attribute |

APPENDIX-continued

```
/***********************************************************************
*   osd_fill_char_attrib- fill pointers area with character and        *
*                         attribute                                     *
*                                                                       *
*       parameter:                                                      *
*               character                                               *
*               attribute                                               *
***********************************************************************/
```

| BYTE NUMBER | CONTENTS |
|---|---|
| 1 | COMMAND = 6 |
| 2 | character |
| 3 | attribute |

```
/***********************************************************************
*   osd_write_ndramchars- write n characters from dram to the screen   *
*                                                                       *
*       parameter:                                                      *
*               row                                                     *
*               col                                                     *
*               number of characters                                    *
*               characters                                              *
*   NOTE: ROW STARTS AT 0 AND COLUMN STARTS AT 0                        *
***********************************************************************/
```

| BYTE NUMBER | CONTENTS |
|---|---|
| 1 | COMMAND = 7 |
| 2 | row |
| 3 | column |
| 4 | number of characters |
| 5 | characters 1 |
| • | • |
| • | • |
| • | • |
| • | character n |

```
/***********************************************************************
*   osd_write_attribn- write an attribute to the screen n times        *
*       parameter:                                                      *
*                                                                       *
*               row                                                     *
*               col                                                     *
*               number of times to write attribute                      *
*               attribute                                               *
*                                                                       *
*   NOTE: ROW STARTS AT 0 AND COLUMN STARTS AT 0                        *
***********************************************************************/
```

| BYTE NUMBER | CONTENTS |
|---|---|
| 1 | COMMAND = 8 |
| 2 | row |
| 3 | column |
| 4 | number of times to write attribute |
| 5 | attribute |

```
/***********************************************************************
*                                                                       *
*   osd_write_charn- write a character to the screen n times           *
*                                                                       *
*       parameter:                                                      *
*               row                                                     *
*               col                                                     *
*               number of times to write character                      *
*               character                                               *
*                                                                       *
*   NOTE: ROW STARTS AT 0 AND COLUMN STARTS AT 0                        *
***********************************************************************/
```

| BYTE NUMBER | CONTENTS |
|---|---|
| 1 | COMMAND = 9 |
| 2 | row |
| 3 | column |
| • | number of times to write character |

APPENDIX-continued

```
/************************************************************
*                                                            *
*   osd_write_ndramchars_wattrib- write n characters from dram with a   *
*                    single attribute to the screen          *
*                                                            *
*        parameter:                                          *
*              row                                           *
*              col                                           *
*              number of characters to write                 *
*              attribute                                     *
*              characters                                    *
*                                                            *
*   NOTE: ROW STARTS AT 0 AND COLUMN STARTS AT 0             *
*                                                            *
************************************************************/
```

| BYTE NUMBER | CONTENTS |
|---|---|
| 1 | COMMAND = 10 |
| 2 | row |
| 3 | column |
| 4 | number of characters to write |
| 5 | attribute |
| 6 | character 1 |
| • | • |
| • | • |
| • | • |
| • | character n |

```
/************************************************************
*                                                            *
*   osd_write_ndramchar_attrib- write n characters and attribute pairs  *
*                    from dram to the screen                 *
*                                                            *
*        parameter:                                          *
*              row                                           *
*              col                                           *
*              number of pairs to write                      *
*              character/attribute pairs                     *
*                                                            *
*   NOTE: ROW STARTS AT 0 AND COLUMN STARTS AT 0             *
*                                                            *
************************************************************/
```

| BYTE NUMBER | CONTENTS |
|---|---|
| 1 | COMMAND = 11 |
| 2 | row |
| 3 | column |
| 4 | number of pairs to write |
| 5 | character 1 |
| 6 | attribute 1 |
| • | • |
| • | • |
| • | character n |
| • | attribute n |

APPENDIX-continued

```
/***************************************************************
*                                                               *
*  osd_display_parm- display memory parameter                   *
*                                                               *
*       parameter - row                                         *
*                  column                                       *
*                  parameter number                             *
*                  number of characters                         *
*                                                               *
****************************************************************/
```

| BYTE NUMBER | CONTENTS |
|---|---|
| 1 | COMMAND = 12 |
| 2 | row |
| 3 | column |
| 4 | parameter number |
| 5 | number of characters |

```
/***************************************************************
*                                                               *
*  set interactive buffer- set all bytes in the 20 byte dram    *
*                          interactive buffer to val an set id  *
*                                                               *
*              parameter:                                       *
*                  value                                        *
*                  interactive id                               *
*                                                               *
****************************************************************/
```

| BYTE NUMBER | CONTENTS |
|---|---|
| 1 | COMMAND = 13 |
| 2 | value |
| 3–6 | id |

Processing:
 - set all bytes of the interactive buffer to value
 - set id bytes t id

```
/***************************************************************
*                                                               *
*  wait in select- look for select key prior to transmitting the dram *
*                  interactive buffer                           *
*                                                               *
*              parameter:                                       *
*                  timeout                                      *
*                                                               *
****************************************************************/
```

| BYTE NUMBER | CONTENTS |
|---|---|
| 1 | COMMAND = 14 |
| 2–3 | timeout |

Processing:
 - save dram address of this command
 - set states state to "get select"
 - set timeout timer
 - exit state processing

APPENDIX-continued

```
/**************************************************************************
*   get interactive character- position cursor to row column indicated    *
*                              and write a blinking underline,            *
*                              save dram address of this download dsp     *
*                              command, set state to "get interactive     *
*                              char", set character timeout, and exit     *
*                              state processing                           *
*                                                                         *
*                              parameter:                                 *
*                                       row                               *
*                                       column                            *
*                                       interactive buffer offset         *
*                                       valid character low value         *
*                                       valid character high value        *
*                                       timeout                           *
***************************************************************************/
    BYTE NUMBER                      CONTENTS
    -----------                      --------
        1                            COMMAND = 15
        2                            row
        3                            column
        4                            interactive buffer offset (0-19)
        5                            valid character low value
        6                            valid character high value
        7-8                          timeout
    Processing:
            - set character at row/col to underline & blink
            - save dram address of this command
            - set states state to "get interactive character"
            - set timeout timer
            - exit state processing
/**************************************************************************
*                                                                         *
*   NOOP- no op                                                           *
*                                                                         *
***************************************************************************/
    BYTE NUMBER                      CONTENTS
    -----------                      --------
        1                            COMMAND = 16
```

What is claimed is:

1. A display system for generating a first video signal, said display system being a subsystem of a subscriber terminal of a cable television system, said display system comprising:

a data extractor for receiving an input command transmitted by a remote transmitter, said remote transmitter being a subsystem of a headend of the cable television system and said input command including a header portion, a command portion and a display data portion, wherein said header portion indicates whether said input command is global in nature and therefore should be received by all subscribers or is addressed in nature and therefore should be received by particular subscribers, and said command portion defines an operation that said display system will perform using said display data portion;

a dynamic, non-volatile memory;

a control processor, said control processor including first program means for modifying at least one of symbol data and graphics data stored in said dynamic, non-volatile memory according to said input command;

a control processor for converting at least one of said symbol data and graphics data to pixel data, said control processor further including second program means for configuring said digital processor; and a video processor, responsive to said digital processor, for converting said pixel data to an analog pixel signal and for generating said first video signal by multiplexing between said analog pixel signal and a second video signal.

2. The display system according to claim 1, said video processor multiplexing between said analog pixel signal and said second video signal on a screen by screen basis.

3. The display system according to claim 1, said video processor multiplexing between said analog pixel signal and said second video signal on a pixel by pixel basis.

4. The display system according to claim 1 wherein operation of said first program means of said control processor is controlled by a first program.

5. The display system according to claim 1, said symbol data including a plurality of character sets, each of said character sets defining a plurality of characters, wherein each of said characters is defined by an m by n array of pixels.

6. The display system according to claim 5, one of said character sets being an English character set.

7. The display system according to claim 5, one of said character sets being a Chinese character set.

8. The display system according to claim 5, one of said character sets being an Arabic character set.

9. The display system according to claim 5, one of said character sets being a Japanese character set.

10. The display system according to claim 1, said remote transmitter transmitting said input command using in-band signaling techniques.

11. The display system according to claim 1, said remote transmitter transmitting said input command using out-of-band signaling techniques.

12. The display system according to claim 1, said input command being derived from a display screen building language that compresses multiple instructions into a single command.

13. The display system according to claim 1, said command portion of said input command being for loading a color data value into a color palette register, wherein a color palette register number and said color data value is specified in said display data portion of said input command.

14. The display system according to claim 1, said command portion of said input command being for modifying a line attribute register, wherein a line number is specified in said display data portion of said input command.

15. The display system according to claim 1, said command portion of said input command being for loading a border screen register with a color data value, wherein said color data value is specified in said display data portion of said input command.

16. The display system according to claim 1, said command portion of said input command being for filling a screen of pixels of an associated television receiver with a particular symbol, wherein an address of said particular symbol is specified in said display data portion of said input command.

17. The display system according to claim 1, said command portion of said input command being for making a screen of symbol data share a common attribute, wherein said common attribute is specified in said display data portion of said input command.

18. The display system according to claim 1, said command portion of said input command being for filling a screen of pixels of an associated television receiver with a particular symbol having an attribute, wherein an address of said particular symbol and said attribute is specified in said display data portion of said input command.

19. The display system according to claim 1, said command portion of said input command being for displaying n symbols on an associated television receiver starting at a particular row and column of a screen of pixels, wherein said row, said column, number n, and an address for each of said n symbols are specified in said display data portion of said input command.

20. The display system according to claim 1, said command portion of said input command being for displaying n symbols sharing a common attribute on an associated television receiver starting at a particular row and column of a screen of pixels, wherein said row, said column, number n, and said common attribute are specified in said display data portion of said input command.

21. The display system according to claim 1, said command portion of said input command being for displaying a particular symbol on an associated television receiver n times starting at a particular row and column of a screen of pixels, wherein said row, said column, an address of said particular symbol, and number n are specified in said display data portion of said input command.

22. The display system according to claim 1, said command portion of said input command being for displaying n symbols sharing a common attribute on an associated television receiver starting at a particular row and column of a screen of pixels, wherein said row, said column, number n, said common attribute, and an address for each of said n symbols are specified in said display data portion of said input command.

23. The display system according to claim 1, said command portion of said input command being for displaying n symbols, each having a particular attribute, on an associated television receiver starting at a particular row and column of a screen of pixels, wherein said row, said column, number n, an address for each of said n symbols, and said attribute of each of said n symbols are specified in said display data portion of said input command.

24. The display system according to claim 1, said command portion of said input command being for displaying a display parameter having n symbols on an associated television receiver starting at a particular row and column of a screen of pixels, wherein said row, said column, a display parameter number corresponding to said display parameter, and number n are specified in said display data portion of said input command.

25. The display system according to claim 1, said command portion of said input command setting a first portion of a volatile memory to a first value and setting a second portion of said dynamic, non-volatile memory to a second value, wherein said first and second values are specified in said display portion of said input command.

26. The display system according to claim 1, said command portion of said input command making said control processor wait for one of a specific input command and a timeout period before transmitting data from a first memory to a second memory, wherein said timeout period is specified in said display data portion of said input command.

27. The display system according to claim 1, said command portion of said input command being for displaying a blinking cursor on an associated television receiver at a particular row and column of a screen of pixels, wherein said row and said column is specified in said display data portion of said input command.

28. The display system according to claim 1, said command portion causing no operation to occur.

29. The display system according to claim 1, said dynamic, non-volatile memory being a FLASH EPROM.

30. A display system comprising:
a data extractor for extracting remotely generated data from an input signal and for determining whether said extracted data comprises display control information, said input signal being generated by a subscription television system that provides the remotely generated data as communication transactions from a headend to said display system, said communication transactions including a first transaction including command and parameter data, said data extractor including means for receiving the remotely generated data at the display system in one or more communication transactions;
a dynamic, non-volatile memory;
a control processor performing at least one of storing and replacing said display control information in the dynamic, non-volatile memory, the control processor processing said command and parameter data into display control information wherein said display control information comprises display information and display attributes; and
a display controller, responsive to said control processor, for generating a video display signal based on contents of the dynamic, non-volatile memory.

31. A display system as set forth in claim 30, wherein said control processor further includes means to configure said display controller with said display control information.

32. A display system as set forth in claim 1, wherein said command defines an on-screen display with a selected symbol.

33. A display system as set forth in claim 1, wherein said command defines symbols of an on-screen display with an attribute.

34. A display system as set forth in claim 1, wherein said command defines an on-screen display with a selected symbol having a selected attribute.

35. A display system as set forth in claim 1, wherein said command causes said display controller to write n symbols on an on-screen display.

36. A display system as set forth in claim 35 wherein said command constitutes a command to give each of said n symbols the same attribute.

37. A display system as set forth in claim 35, wherein said command constitutes a command to give each of said n symbols a different attribute.

38. A display system as set forth in claim 1, wherein said command defines n symbols with an attribute.

39. A display system as set forth in claim 1, wherein said command causes said display controller to write a selected symbol n times on an on-screen display.

40. The display system as set forth in claim 30, said display control information including information controlling at least one of menu screens, barker screens, and graphic screens.

41. A method for remotely programming a display system for generating a first video signal, said display system including a display controller, said method comprising the steps of:

receiving a remotely generated input command, said input command being derived from a display screen building language that compresses multiple instructions into a single command;

modifying at least one of symbol data and graphics data according to said input command, said at least one of symbol data and graphics data constituting first display information;

configuring the display controller of said display system based on said modified first display information;

converting said modified first display data to pixel data in said display controller;

converting said pixel data to an analog pixel signal; and generating said first video signal, said step of generating including multiplexing between said analog pixel signal and a second video signal.

42. The method for remotely programming a display system according to claim 41, wherein said step of multiplexing between said analog pixel signal and said second video signal includes multiplexing on a screen by screen basis.

43. The method for remotely programming a display system according to claim 41, wherein said step of multiplexing between said analog pixel signal and said second video signal is performed on a pixel by pixel basis.

44. The method for remotely programming a display system according to claim 41, wherein:

said display system is a subsystem of a subscriber terminal of a cable television system;

said cable television system includes a headend having a remote transmitter; and said step of receiving a remotely generated input command includes receiving the input command from the remote transmitter.

45. The method for remotely programming a display system according to claim 44, wherein said step of receiving the input command includes receiving said input command using in-band signaling techniques.

46. The method for remotely programming a display system according to claim 44, wherein said step of receiving the input command includes receiving said input command using out-of-band signaling techniques.

47. The method for remotely programming a display system according to claim 44, wherein said step of receiving a remotely generated input command includes receiving an input command that includes a header portion, a command portion, and a display data portion, wherein said header portion indicates whether said input command is global in nature and therefore should be received by all subscribers or is addressed in nature and therefore should be received by particular subscribers, and said command portion defines an operation that said display system will perform using said display data portion.

48. The method for remotely programming a display system according to claim 47, wherein:

said command portion of said input command includes a command for loading a color data value into a color palette register; and said step of receiving an input command includes receiving a color palette register number and said color data value in said display data portion of said input command, said color palette register number corresponding to the color palette register to be loaded.

49. The method for remotely programming a display system according to claim 47, wherein:

said command portion of said input command includes a command for modifying a line attribute register; and said step of receiving an input command includes receiving a line number in said display data portion of said input command, said line number corresponding to the line attribute register to be modified.

50. The method for remotely programming a display system according to claim 47, wherein:

said command portion of said input command includes a command for loading a border screen register with a color data value; and said step of receiving an input command includes receiving said color data value in said display data portion of said input command.

51. The method for remotely programming a display system according to claim 47, wherein:

said command portion of said input command includes a command for filling a screen of pixels of an associated television receiver with a particular symbol; and said step of receiving an input command includes receiving an address of said particular symbol in said display data portion of said input command.

52. The method for remotely programming a display system according to claim 47, wherein:

said command portion of said input command includes a command for making a screen of symbol data share a common attribute; and said step of receiving an input command includes receiving said common attribute in said display data portion of said input command.

53. The method for remotely programming a display system according to claim 47, wherein:

said command portion of said input command includes a command for filling a screen of pixels of an associated television receiver with a particular symbol having an attribute; and said step of receiving an input command includes receiving an address of said particular symbol and said attribute in said display data portion of said input command.

54. The method for remotely programming a display system according to claim 47, wherein:

said command portion of said input command includes a command for displaying N symbols on an associated television receiver starting at a particular row and column of a screen of pixels; and said step of receiving an input command includes receiving said row, said column, a number N, and an address for each of said N symbols in said display data portion of said input command.

55. The method for remotely programming a display system according to claim 47, wherein:

said command portion of said input command includes a command for displaying N symbols sharing a common attribute on an associated television receiver starting at a particular row and column of a screen of pixels; and said step of receiving an input command includes receiving said row, said column, a number N, and said common attribute in said display data portion of said input command.

56. The method for remotely programming a display system according to claim 47, wherein:

said command portion of said input command includes a command for displaying a particular symbol on an associated television receiver N times starting at a particular row and column of a screen of pixels; and said step of receiving an input command includes receiving said row, said column, an address of said particular symbol, and a number N in said display data portion of said input command.

57. The method for remotely programming a display system according to claim 47, wherein:

said command portion of said input command includes a command for displaying N symbols sharing a common attribute on an associated television receiver starting at a particular row and column of a screen of pixels; and said step of receiving an input command includes receiving said row, said column, a number N, said common attribute, and an address for each of said N symbols in said display data portion of said input command.

58. The method for remotely programming a display system according to claim 47, wherein:

said command portion of said input command includes a command for displaying N symbols, each having a particular attribute, on an associated television receiver starting at a particular row and column of a screen of pixels; and said step of receiving an input command includes receiving said row, said column, a number N, an address for each of said N symbols, and said attribute of each of said N symbols in said display data portion of said input command.

59. The method for remotely programming a display system according to claim 47, wherein:

said command portion of said input command includes a command for displaying a display parameter having N symbols on an associated television receiver starting at a particular row and column of a screen of pixels; and said step of receiving an input command includes receiving said row, said column, a display parameter number corresponding to said display parameter, and a number N in said display data portion of said input command.

60. The method for remotely programming a display system according to claim 47, wherein:

said command portion of said input command includes a command for setting a first portion of a volatile memory to a first value and for setting a second portion of said dynamic, non-volatile memory to a second value; and said step of receiving an input command includes receiving said first and second values in said display data portion of said input command.

61. The method for remotely programming a display system according to claim 47, wherein:

said command portion of said input command includes a command for making said control processor wait for one of a specific input command and a timeout period before transmitting data from a first memory to a second memory; and said step of receiving an input command includes receiving said timeout period in said display data portion of said input command.

62. The method for remotely programming a display system according to claim 47, wherein:

said command portion of said input command for displaying a blinking cursor on an associated television receiver at a particular row and column of a screen of pixels; and said step of receiving an input command includes receiving said row and said column in said display data portion of said input command.

63. The method for remotely programming a display system according to claim 47, wherein said command portion of said input command includes a command for causing no operation to occur.

64. A method for remotely programming a display system of a subscriber terminal for generating a first video signal said display system including a non-volatile memory to store first display information which controls said display system said first display information including at least one of display data and display attributes, said display system further including first memory means for storing a display routine and second memory means for storing an expansion routine, said non-volatile memory constituting third memory means for storing said first display information, said display system further including fourth memory means for storing said second display information, said method comprising the steps of:

receiving a remotely generated input command in said subscriber terminal;

modifying said first display information according to said input command so that said display system functions according to said input command, said input command constituting second display information;

generating said first video signal based on said first display information;

storing said second display information in said fourth memory means;

checking said fourth memory means to determine whether said second display information has been stored therein;

when it has been determined that the second display information has been stored in said fourth memory means, determining whether said first display information needs a change based on said second display information, said step of determining whether said first information needs a change including reading said first display information and determining whether said second display information constitutes a command to set said first display information to information different than said first display information as stored in said third memory means; and when it has been determined that said first display information needs change, performing said expansion routine, said step of performing said expansion routine including accessing said second display information and replacing at least some of said first display information with said second display information in said third memory means.

65. The method for remotely reprogramming a display system according to claim 54, further comprising a step of automatically initiating said display routine after performing said expansion routine.

66. The method for remotely reprogramming a display system according to claim 54, wherein said step of receiving includes receiving said second display information in compressed form.

67. The method for remotely reprogramming a display system according to claim 54, wherein said step of generating said first video signal includes steps of:

processing said first display information into pixel data;

converting the pixel data into an analog pixel signal; and generating said first video signal based on the analog pixel signal.

68. The method for remotely reprogramming a display system according to claim 67, wherein said step of generating said first video signal includes multiplexing said analog pixel signal with a second video signal.

69. The method for remotely reprogramming a display system according to claim 64, wherein:

said display system includes a display controller; and said step of generating said first video signal includes configuring said display controller with said display attributes.

70. The method for remotely reprogramming a display system according to claim 64, further comprising steps of:

performing said display routine, said step of performing said display routine includes accessing said first display information from said third memory; and returning to a normal operating routine after performing said display routine.

71. The method for remotely reprogramming a display system according to claim 64, wherein said step of checking includes monitoring a software flag whose state corresponds to the receipt of said second display information in said fourth memory.

72. The method for remotely reprogramming a display system according to claim 64, wherein:

said first display information includes color registers with associated values as well as other information; and said step of performing said expansion routine retains said associated values of said color registers of said first display information while replacing at least some of said other information with said second display information.

73. The method for remotely reprogramming a display system according to claim 64, wherein:

said first display information includes symbol set definitions as well as other information; and said step of performing said expansion routine retains said symbol set definitions of said first display information while replacing at least some of said other information with said second display information.

74. The method for remotely reprogramming a display system according to claim 64, wherein said step of replacing said at least some of said first display information includes replacing at least one of screen parameter register values and information locating said displayable screens in said third memory, said screen parameter register values includes values indicating portions of displayable screens.

75. A display system for generating a first video signal comprising:

remote command receiving means for receiving an input command transmitted by a remote transmitter;

a non-volatile memory including first memory means and wherein said at least one of symbol data and graphics data constitutes first display information;

control processing means, said control processing means including first program means for modifying at least one of symbol data and graphics data stored in said non-volatile memory according to said input command;

digital processing means for converting at least one of said symbol data and graphics data to pixel data, said control processing means further including second program means for configuring said digital processing means;

video processing means, responsive to said digital processing means, for converting said pixel data to an analog pixel signal and for generating said first video signal by multiplexing between said analog pixel signal and a second video signal;

an output terminal connectable to a display;

second memory means for storing said input command as second display information;

third memory means for storing a display routine, said second program means being responsive to said display routine to configure said digital processing means, with at least some of said first display information, to generate a displayable image for output on said output terminal; and fourth memory means for storing an expansion routine, said first program means being responsive to said expansion routine to determine whether to replace at least some of said first display information with at least part of said second display information when said second memory means has received said second display information and for replacing at least some of said first display information when required.

76. The display system according to claim 75, said display processor automatically initiating said display routine after executing said expansion routine.

77. The display system according to claim 75, said second display information being received by said display system in compressed form.

78. The display system according to claim 75, said second memory including a dynamic, non-volatile memory.

79. The display system according to claim 78, said dynamic, non-volatile memory including at least one of a flash EPROM and a battery backed up RAM.

80. The display system according to claim 75, said control processor performing a normal operating routine when not performing one of said display routine and said expansion routine.

81. The display system according to claim 75, said control processor determining whether said second memory has received said second display information by checking whether a software flag has been set, said software flag corresponding to the receipt of said second display information in said second memory.

82. The display system according to claim 75, said first display information including color registers with associated values as well as other information, said first program means retaining said associated values of said color registers of said first display information while replacing at least some of said other information with said second display information.

83. The display system according to claim 75, said first display information including symbol set definitions as well as other information, said first program means retaining said symbol set definitions of said first display information while replacing at least some of said other information with said second display information.

84. The display system according to claim 75, said first display information which is replaced by said second display information includes at least one of screen parameter register values, which include positions of displayable screens, and information locating said displayable screens.

85. A display system as set forth in claim 30, wherein:

said display controller includes a digital processor and an analog processor;

said digital processor processes the display control information into pixel data; and the analog processor converts the pixel data into an analog pixel signal and generates said video display signal.

* * * * *

UNITED STATES PATENT AND TRADEMARK OFFICE
CERTIFICATE OF CORRECTION

PATENT NO. : 6,166,728
DATED : December 26, 2000
INVENTOR(S) : Haman et al.

It is certified that error appears in the above-identified patent and that said Letters Patent is hereby corrected as shown below:

Column 5,
Lines 45-46, delete "pay-pay-view" and insert therefore -- pay-per-view --

Column 14,
Line 52, delete "non-volative" and insert therefore -- non-volatile --

Column 30,
Line 13, delete "display portion" and insert therefore -- display data portion --
Line 56, delete "claim 1" and insert therefore -- claim 30 --
Line 59, delete "claim 1" and insert therefore -- claim 30 --
Line 62, delete "claim 1" and insert therefore -- claim 30 --
Line 65, delete "claim 1" and insert therefore -- claim 30 --

Column 34,
Line 23, delete "signal" and insert therefore -- signal, --
Line 26, delete "system" and insert therefore -- system, --

Column 35,
Line 2, delete "claim 54" and insert therefore -- claim 64 --
Line 6, delete "claim 54" and insert therefore -- claim 64 --
Line 10, delete "claim 54" and insert therefore -- claim 64 --

Column 38,
Lines 1-9, delete entire Claim 85.

Signed and Sealed this

Twenty-third Day of October, 2001

Attest:

NICHOLAS P. GODICI
Attesting Officer
Acting Director of the United States Patent and Trademark Office